United States Patent [19]

Moore

[11] Patent Number: 5,878,143
[45] Date of Patent: Mar. 2, 1999

[54] SECURE TRANSMISSION OF SENSITIVE INFORMATION OVER A PUBLIC/INSECURE COMMUNICATIONS MEDIUM

[75] Inventor: Robert H. Moore, Phoenix, Ariz.

[73] Assignee: Net 1, Inc., Phoenix, Ariz.

[21] Appl. No.: 699,104

[22] Filed: Aug. 16, 1996

[51] Int. Cl.$^6$ .................................................. H04L 9/00
[52] U.S. Cl. .................................... 380/25; 380/4; 380/9; 380/21; 380/23; 380/24; 380/49; 340/825.31; 340/825.34; 395/186; 395/187.01; 395/188.01
[58] Field of Search .............................. 380/4, 9, 21, 23, 380/24, 25, 28, 48, 49, 50, 59, 29, 30; 340/825.31, 825.34; 395/186, 187.01, 188.01, 226

[56] References Cited

U.S. PATENT DOCUMENTS

| | | | |
|---|---|---|---|
| 4,317,857 | 3/1982 | Sendrow | 380/24 |
| 4,941,176 | 7/1990 | Matyas et al. | 380/21 |
| 5,548,721 | 8/1996 | Denslow | 395/187.01 |

*Primary Examiner*—Bernarr E. Gregory
*Attorney, Agent, or Firm*—James H. Phillips; Michael A. Lechter

[57] ABSTRACT

In order to achieve very secure transmission of sensitive information over a public communications medium such as the Internet to carry out transactions therebetween, an account initialization data set is developed in a client system and duplicated, by secure means, in a host system. At each of the client and host systems, an initial client control file data set including a plurality of control fields (at least one of which includes data developed from information which is unique to the client system hardware) is independently developed and stored using functionally identical algorithms and incorporating information included in at least a part of the account initialization data set. Subsequently, during initiation of a transaction, a validation string generated from a plurality of the client control file data set fields stored in the client system and at least one additional field containing transaction specific information is sent from the client system to the host system over an insecure transmission medium such as the Internet. At the host, a validation string is generated using the corresponding control file data set fields, identically manipulated, and the apparent client generated and host generated initial validation strings are checked for identity. If the initial validation strings are identical, the transaction is carried out; however, if the initial validation strings are not identical, the transaction is aborted. Assuming that the transaction is carried out, updated client control file data sets, which are identically modified according to a predetermined modification procedure from the previous client control file data sets, based on new information which is specific to the transaction just carried out, are independently developed and stored at each of the client and host systems to be used to validate the next transaction.

24 Claims, 25 Drawing Sheets

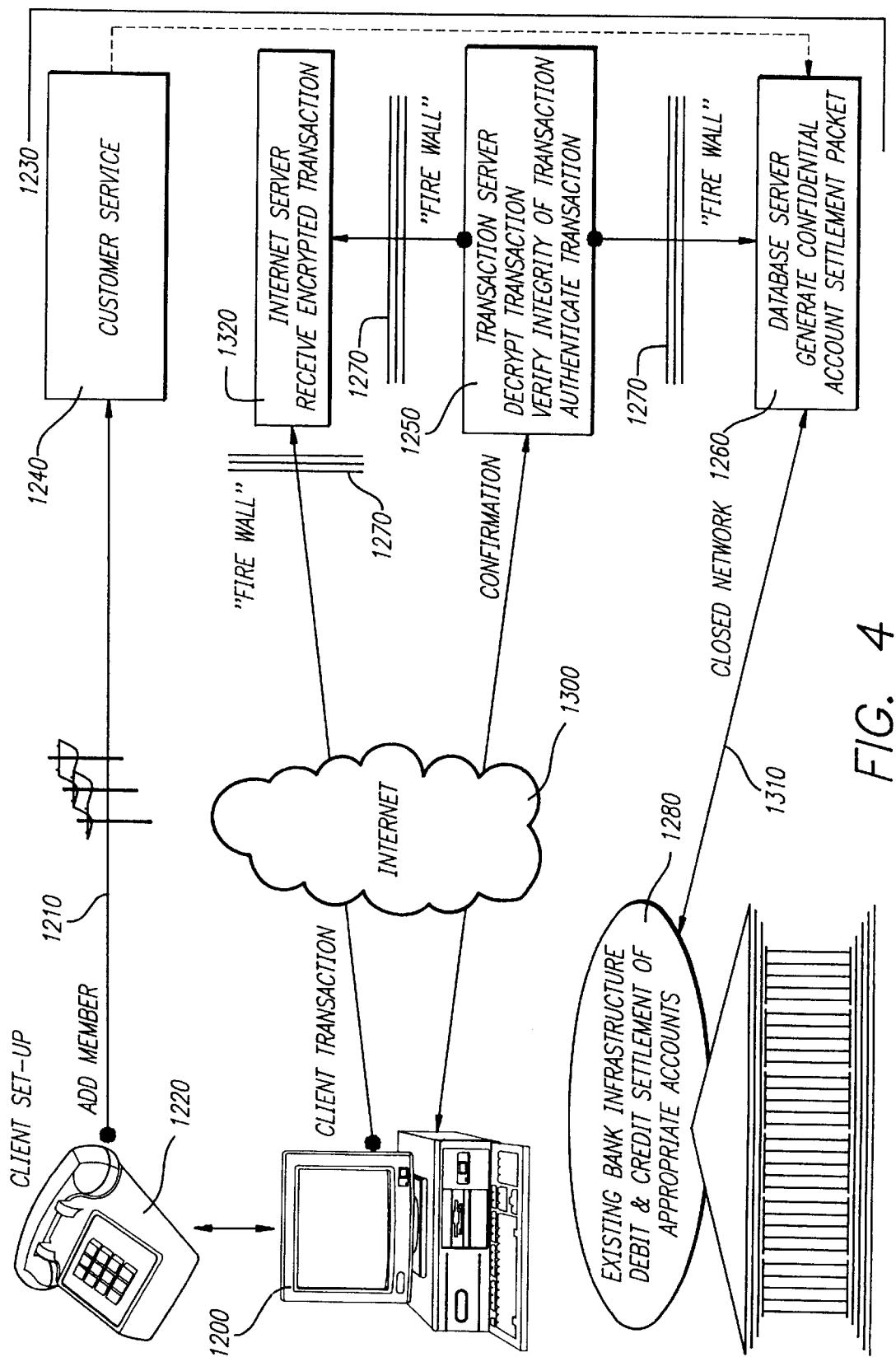

SECURE TRANSMISSION OF SENSITIVE INFORMATION OVER A PUBLIC/INSECURE COMMUNICATIONS MEDIUM

FIELD OF INVENTION

This invention relates to the art of data protection and, more particularly, to achieving very secure transmission of sensitive information over a public/insecure communications medium such as the Internet.

BACKGROUND OF THE INVENTION

Modern commercial and personal business transactions involving the transfer of funds or other assets from one or more accounts to one or more other accounts are being carried out more and more via electronic means. Very often, such transactions are effected across an insecure transmission medium such as the Internet using a certain degree of encryption. The ability of hackers to intercept and decrypt such messages is notoriously well known, and it is widely acknowledged that the degree of encryption currently permitted by the U.S. government is insufficient to protect sensitive information communicated over such insecure transaction communications media. Thus, it will be apparent to those skilled in the art that it would be highly desirable to provide a system which undoubtedly achieves comprehensive and unbreakable transmission of sensitive information involving transactions over insecure communications media such as the Internet.

OBJECTS OF THE INVENTION

It is therefore a broad object of this invention to provide a system for achieving very secure transmission of sensitive transaction information over an insecure public communications system such as the Internet.

It is another object of this invention to provide such a system which is within government requirements with respect to depth of encryption.

In a more specific aspect, it is an object of this invention to provide such a system in which certain key information is changed in a pseudo-random manner between successive transactions between a given client and a host.

In a still more specific aspect, it is an object of this invention to provide such a system in which the changed key information is based, for a given transaction with a given client, on information developed, at both the client and host, from certain particulars of the previous transaction carried out with the same client.

SUMMARY OF THE INVENTION

Briefly, these and other objects of the invention are achieved by employing a procedure for communicating sensitive information securely over an insecure medium from a first computer system (client) to a second computer system (host) to carry out transactions therebetween. Initially, in the client system, special purpose software for installing the routines necessary to carry out the procedure at the client system are supplied to a user through a secure medium. Once a valid installation has been completed, an account initialization data set is developed and transmitted to or otherwise duplicated in the host system. At each of the client and host systems, an initial client control file data set including a plurality of control fields (at least one of which includes data developed from information which is unique to the client system hardware) and incorporating information included in at least a part of the account initialization data set is independently developed and stored using functionally identical algorithms.

Subsequently, during initiation of a first transaction, an initial validation string generated from a plurality of the client control file data set fields stored in the client system (at least one of which control file data set fields includes data developed from information which is unique to the client hardware) and at least one additional field containing transaction specific information is sent from the client system to the host system over an insecure transmission medium such as the Internet. At the host, an initial validation string is generated using the corresponding control file data set fields, identically manipulated, and the apparent client generated and host generated initial validation strings are checked for identity. If the initial validation strings are identical, the transaction is carried out; however, if the initial validation strings are not identical, the transaction is aborted. Assuming that the transaction is carried out, updated client control file data sets, which are identically modified according to a predetermined modification procedure from the previous client control file data sets, based on new information which is specific to the transaction just carried out, are independently developed and stored at each of the client and host systems.

In a similar manner, for subsequent transactions, an updated validation string generated from a plurality of the updated client control file data set fields stored in the client system (at least one of which control file data set fields includes data developed from information which is unique to the client hardware) and at least one additional field containing transaction specific information is sent from the client system to the host system over an insecure transmission medium such as the Internet. At the host, an updated validation string is generated using the corresponding updated control file data set fields, identically manipulated, and the apparent client generated and host generated updated validation strings are checked for identity. If the updated validation strings are identical, the transaction is carried out; however, if the updated validation strings are not identical, the transaction is aborted. Assuming that the transaction is carried out, further updated client control file data sets, which are identically modified according to a predetermined modification procedure from the previous client control file data sets, based on new information which is specific to the transaction just carried out, are independently developed and stored at each of the client and host systems.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 4 is an overview of a typical environment in which the invention finds use.

DESCRIPTION IF THE PREFERRED EMBODIMENT(S)

While the present invention comprehends an integrated process, it is best understood by sequentially considering three main subprocesses: A) Client Account Initialization; B) Client Transaction Initiating; and C) Host Transaction Server. These subprocesses will be discussed in order below.

A) Client Account Initialization

The purpose of the Client Account Initialization subprocess is to determine if a given client station has been initialized; if so, that the client station (for example, a merchant subscribing to a credit card service) is irrefutably the source it is representing itself to be; and if not, to effect initialization of the client station such that, during future transactions, a client station which is undertaking to exchange information with a host system and identifies itself as the given client station is absolutely the same client station previously initialized as the given client station.

Figure 1A:
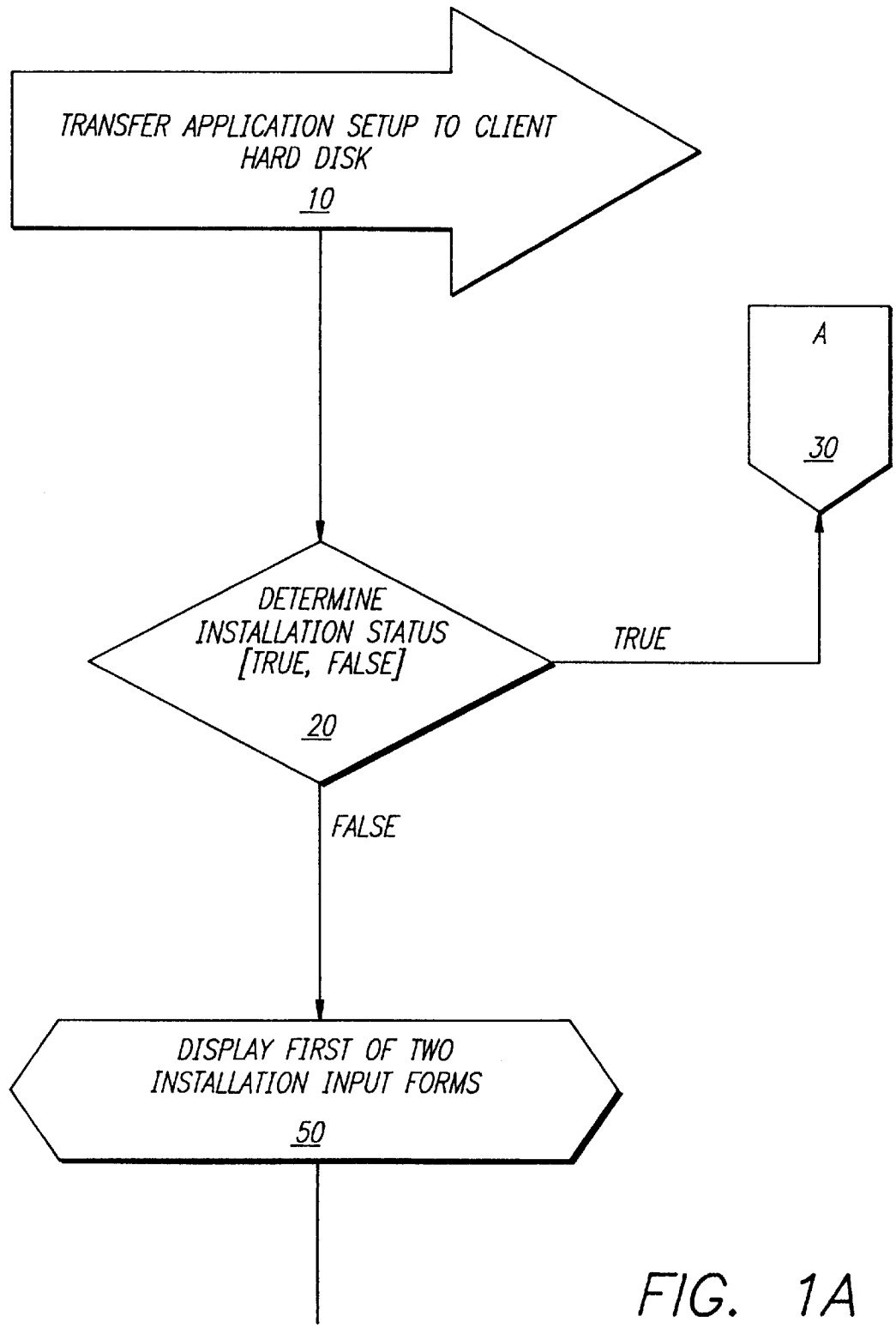
FIG. 1, constituting FIGS. 1A through 1G, inclusive, is a flow chart illustrating a Client Account Initialization subprocess of the invention.
Figure 1B:
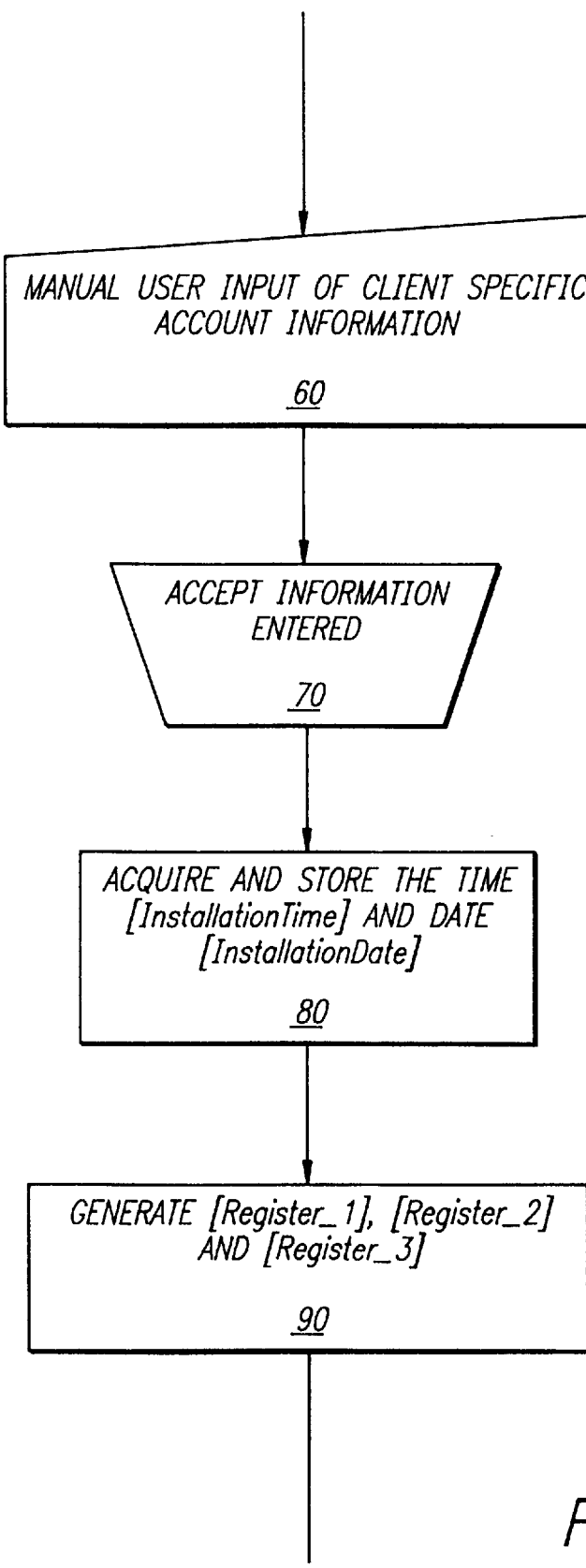
Figure 1C:
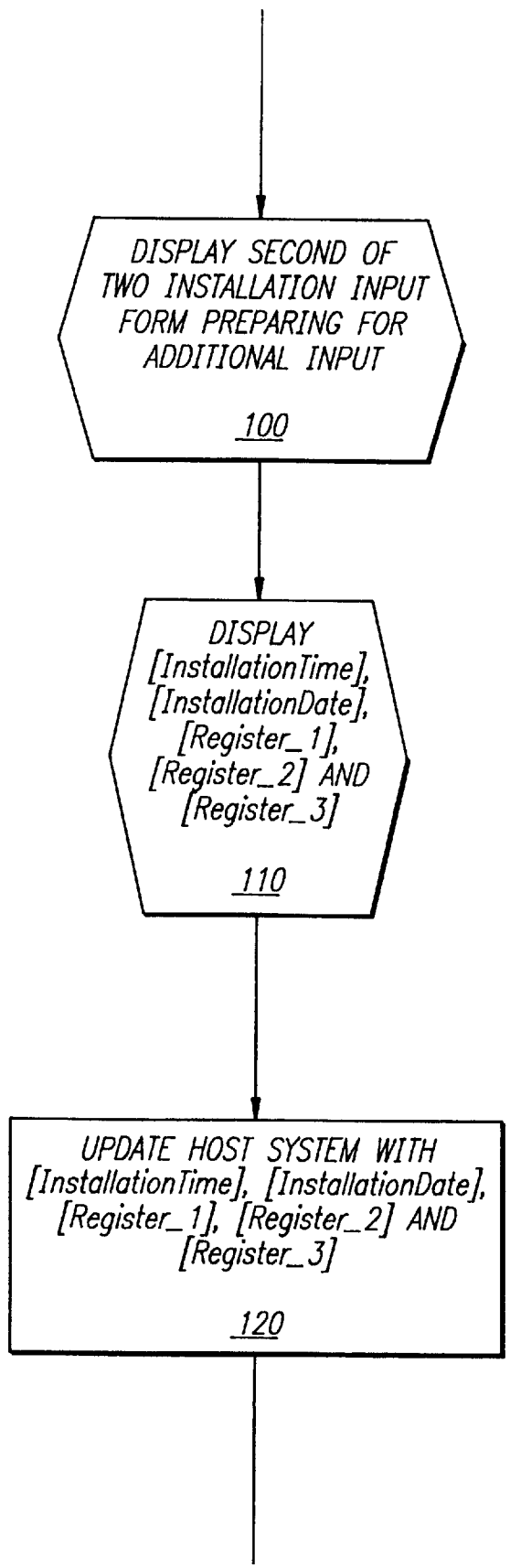
Figure 1D:
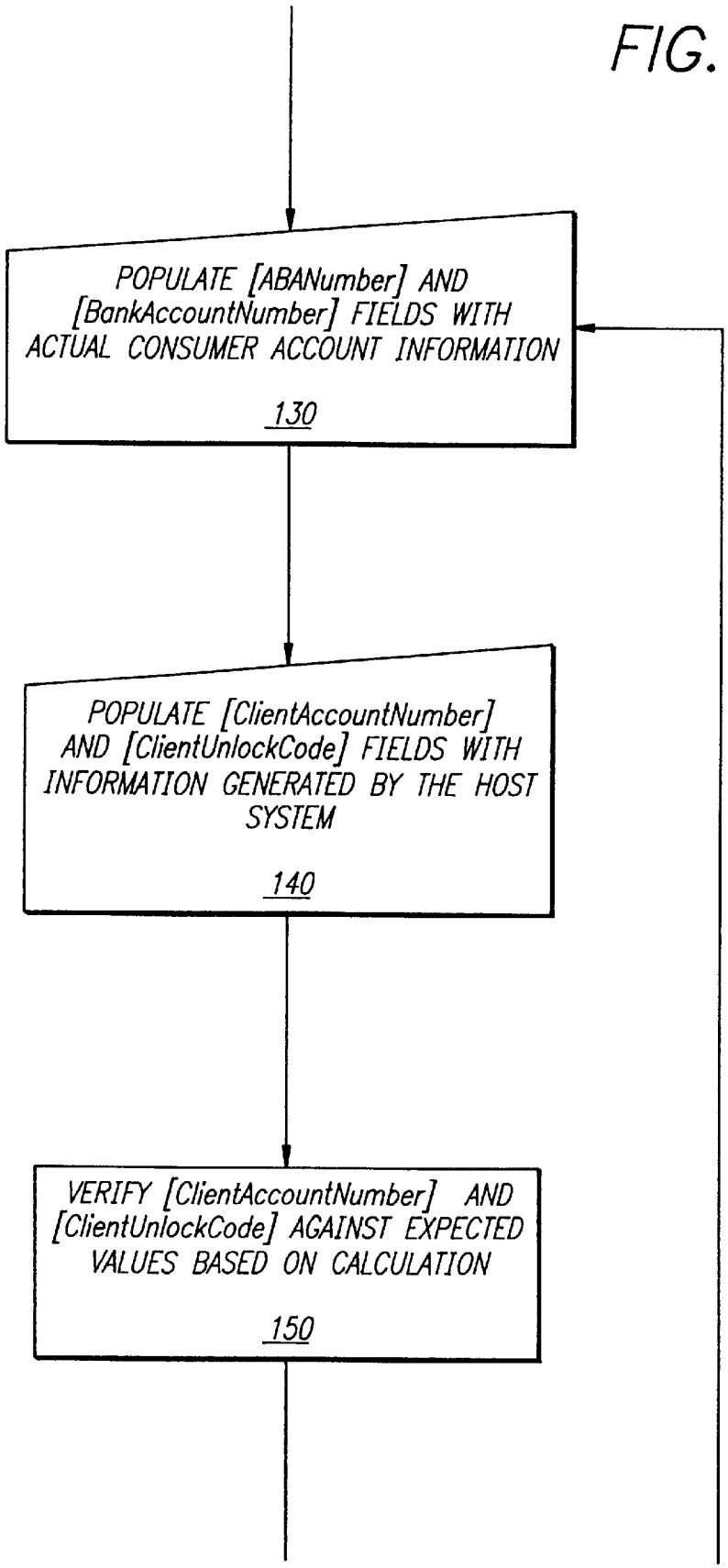
Figure 1E:
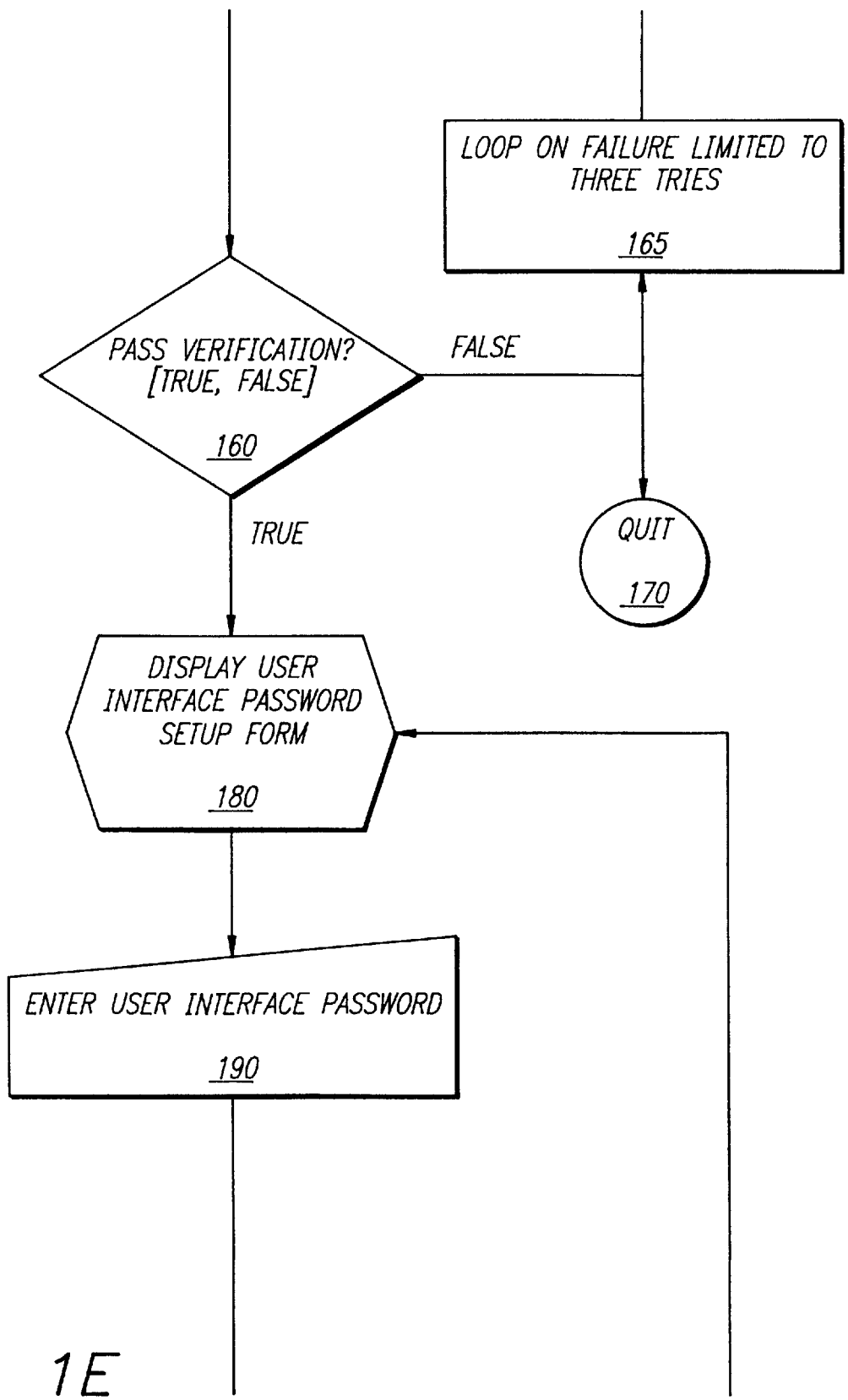
Figure 1F:
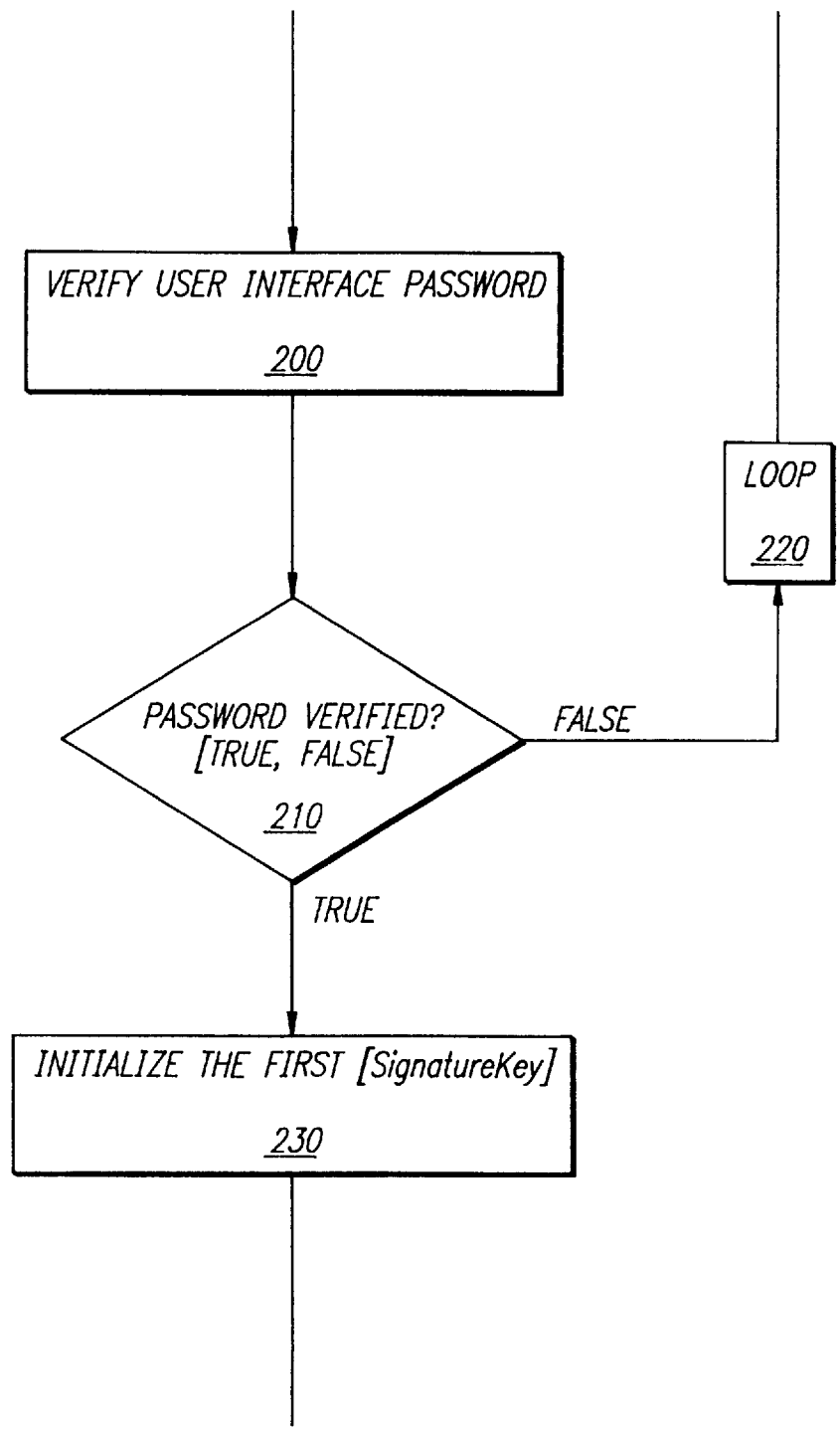
Figure 1G:
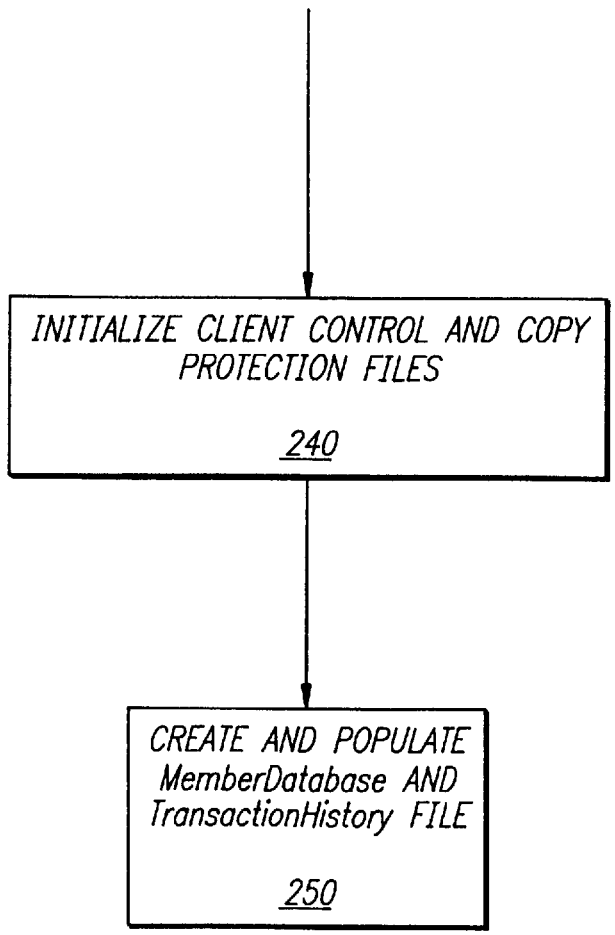
Figure 2A:
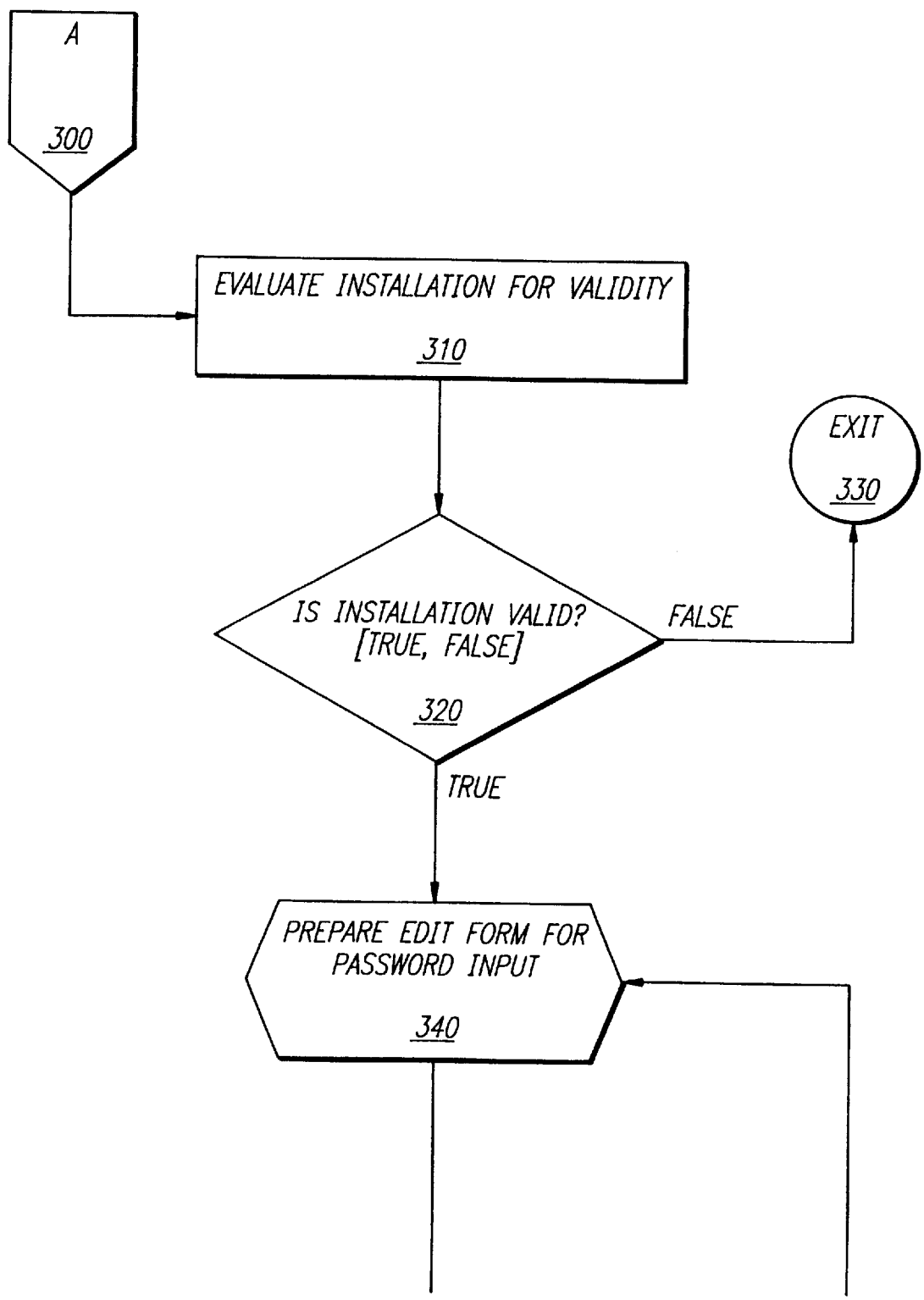
FIG. 2, constituting FIGS. 2A through 2H, inclusive, is a flow chart illustrating a Client Transaction Initiation subprocess of the invention.
Figure 2B:
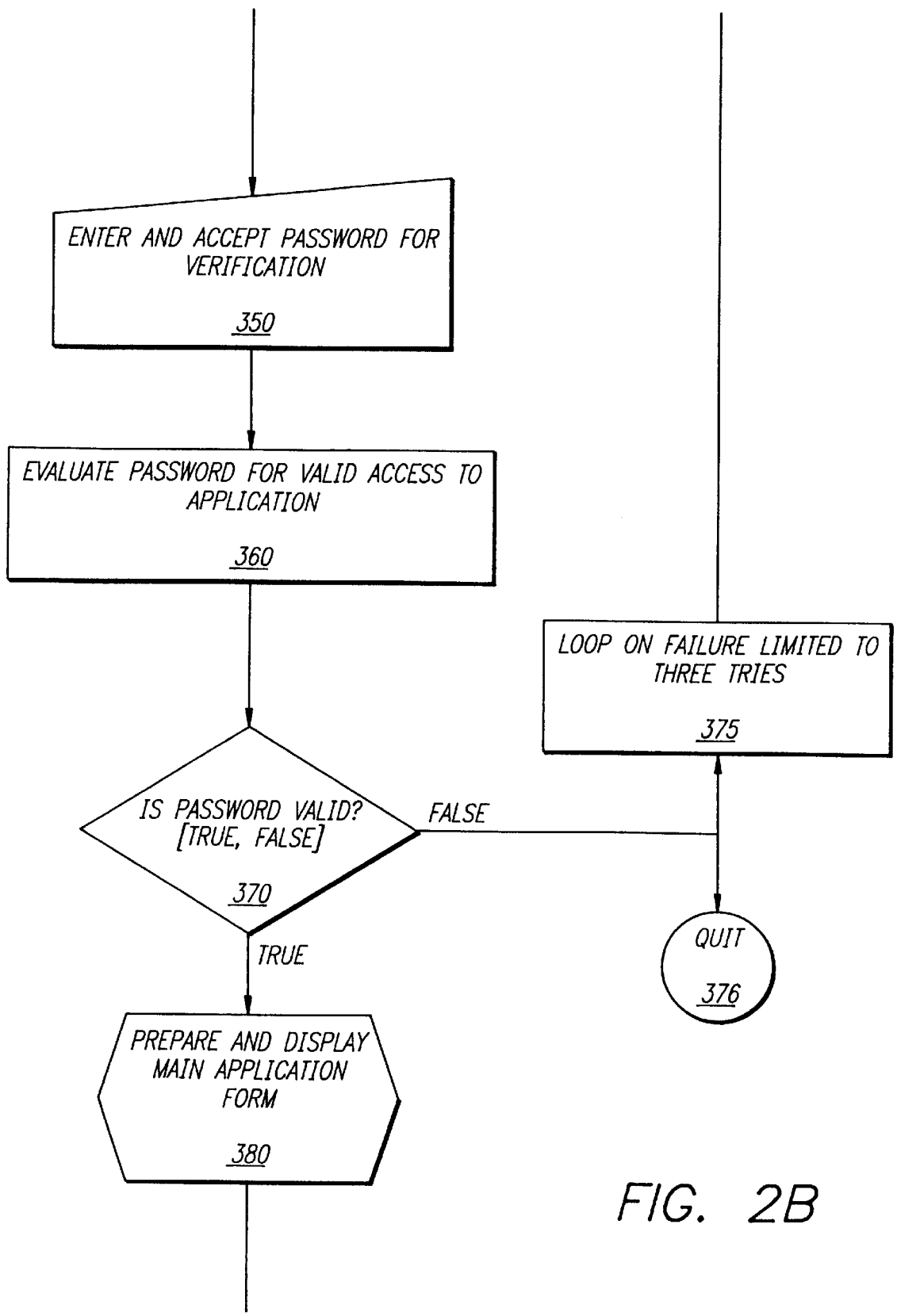
Figure 2C:
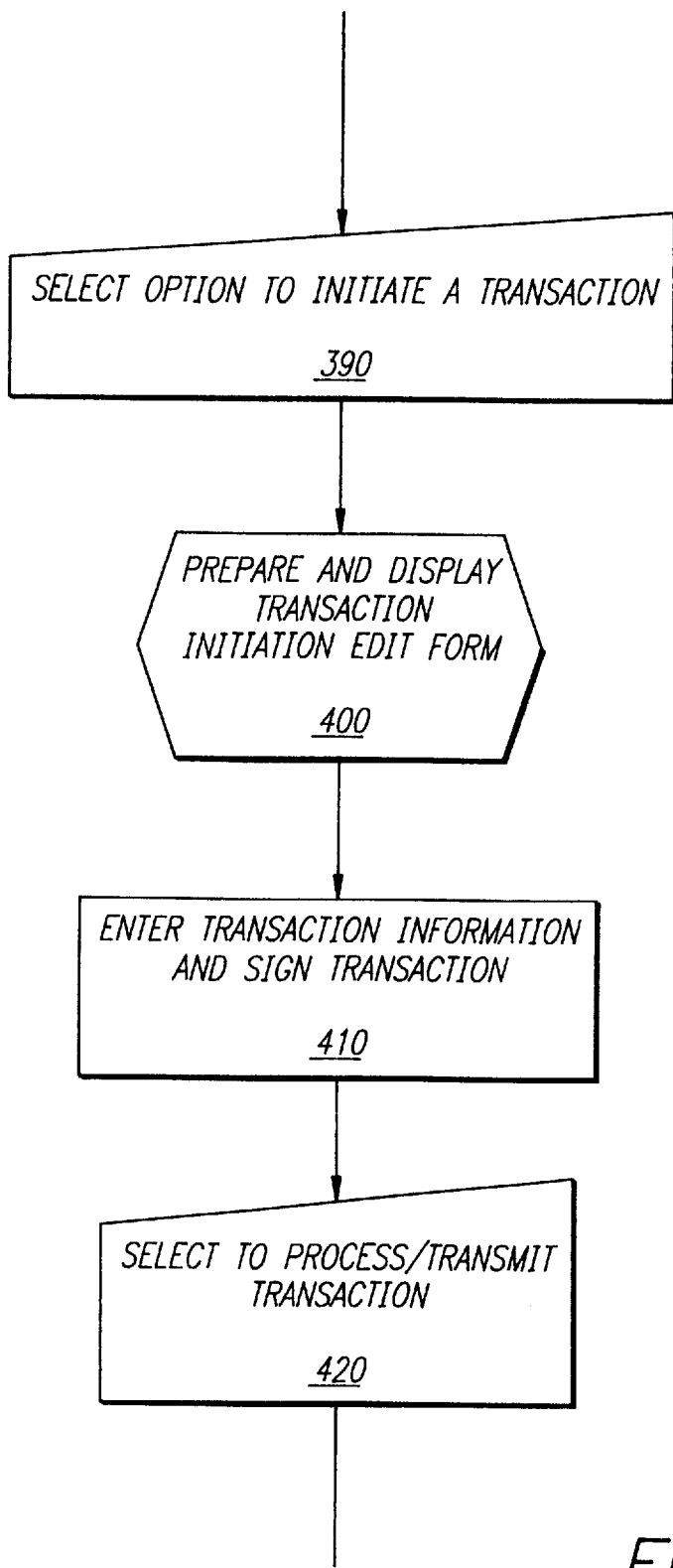
Figure 2D:
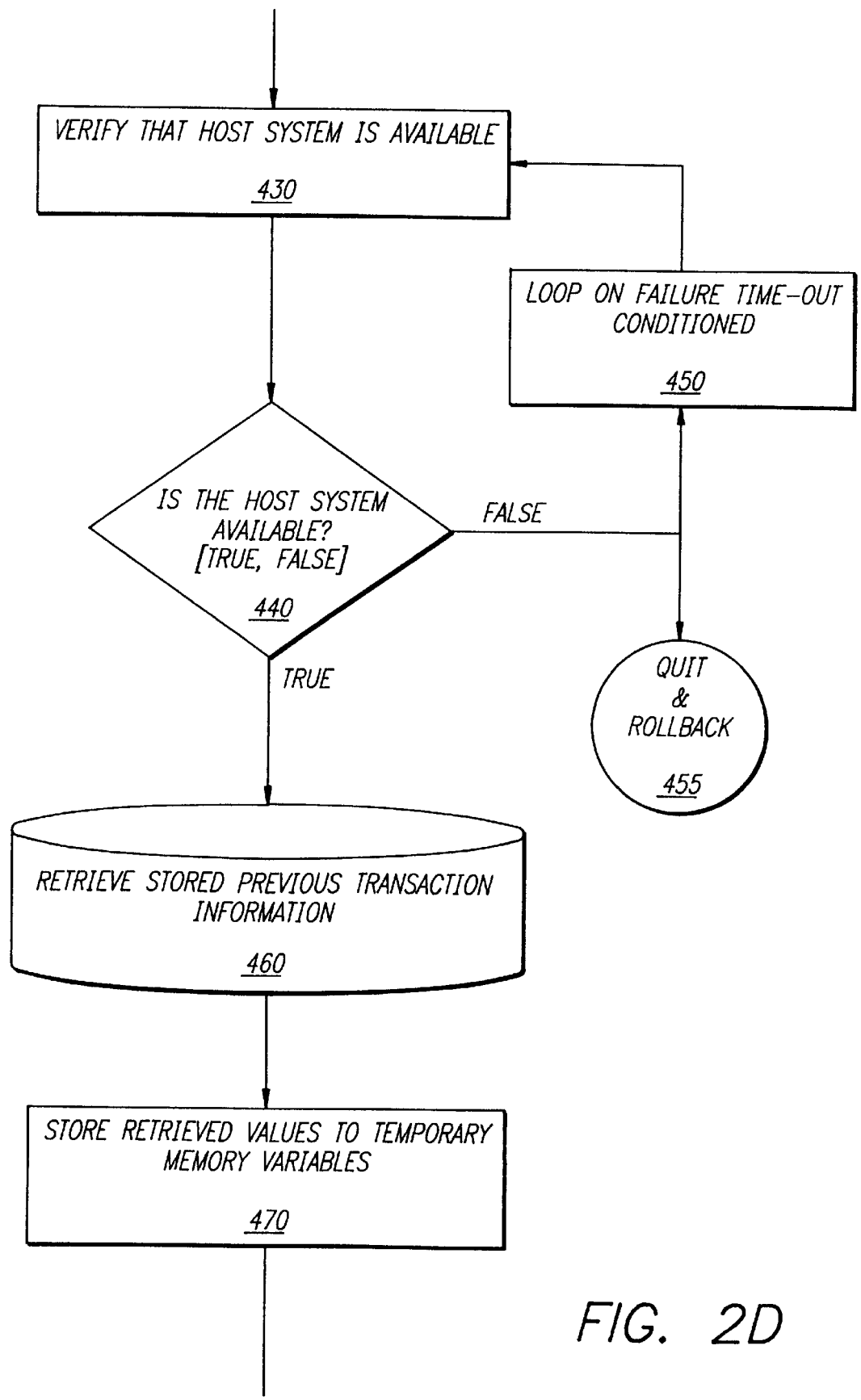
Figure 2E:
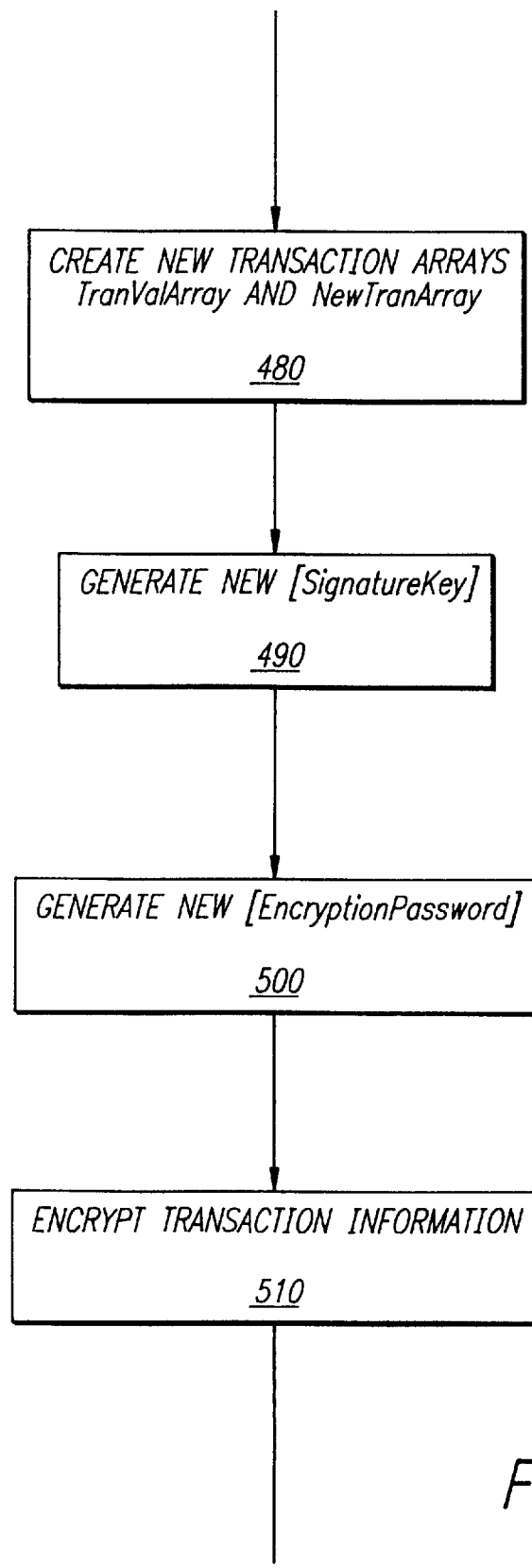
Figure 2F:
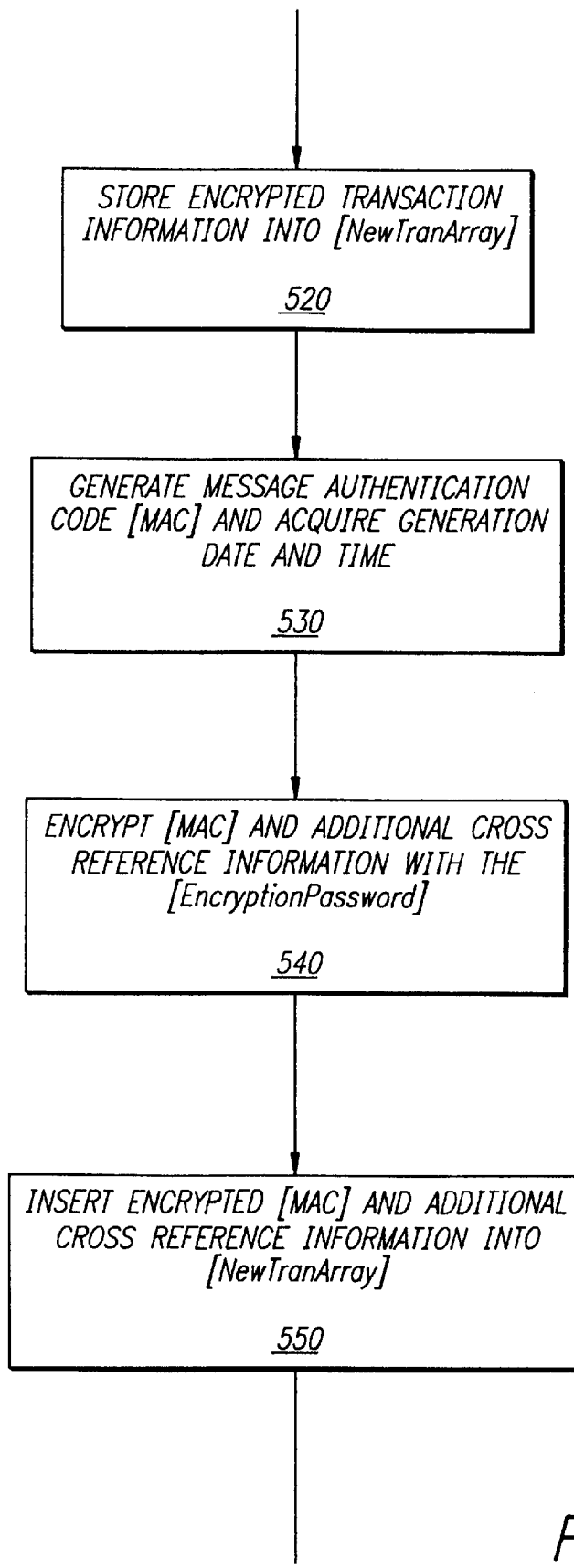
Figure 2G:
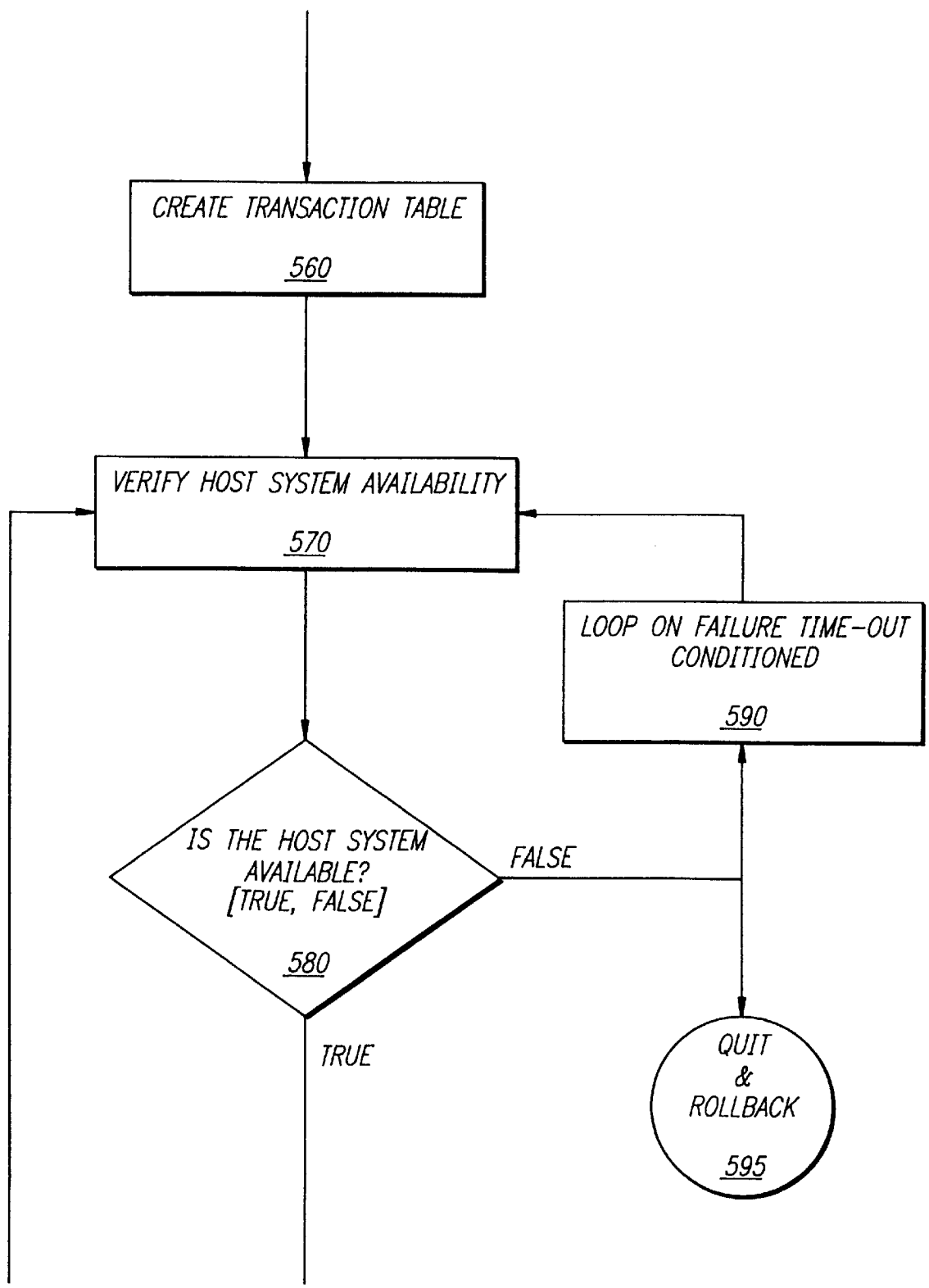
Figure 2H:
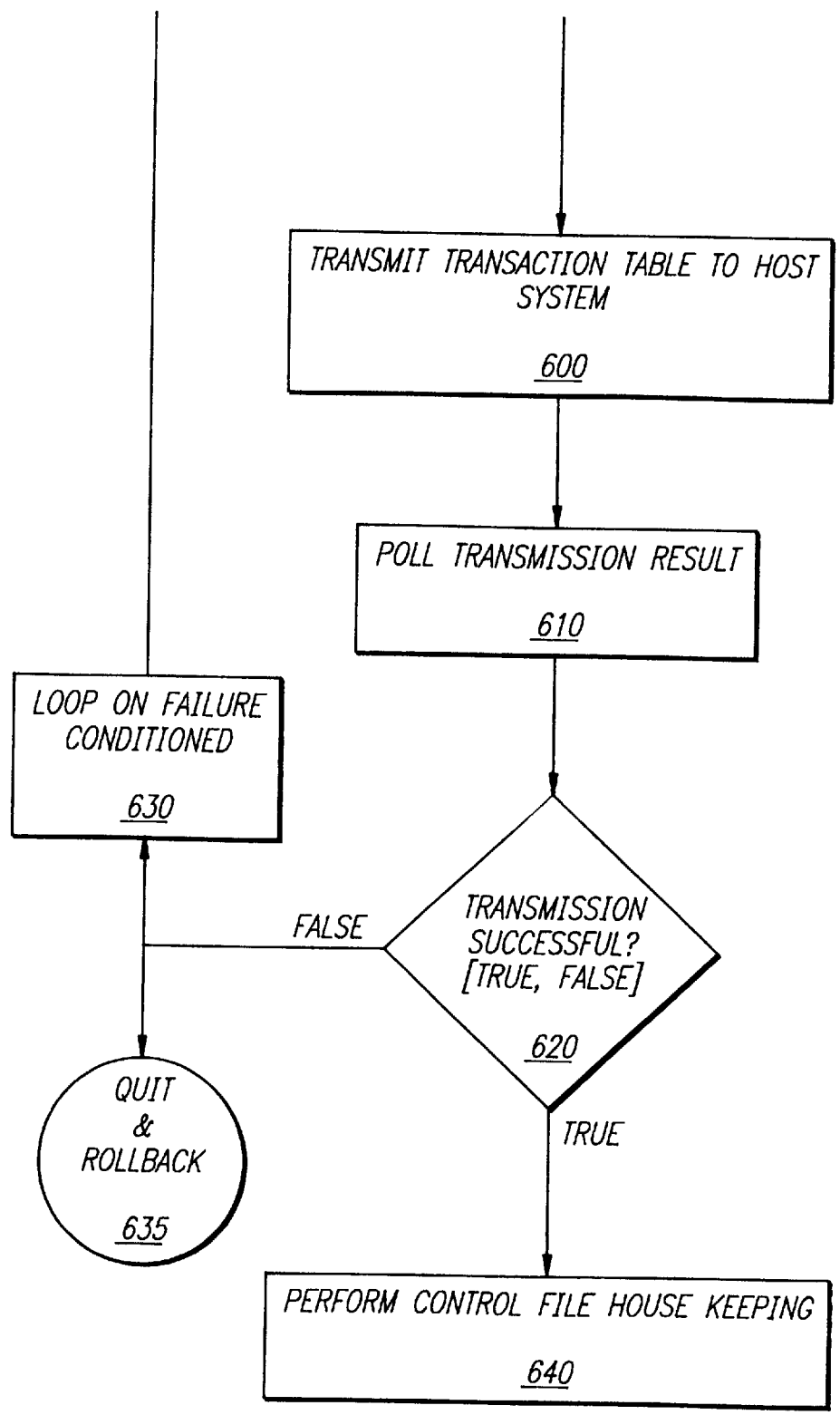

Referring to the flowchart of FIG. 1, when a new client account is to be established, application setup software is installed upon the client's computer system (typically a personal computer) at step 10 and loaded into permanent storage such as a hard disk. During execution of the application setup software, which involves ongoing communication between the host and new client computers, an initial determination is made at step 20 as to whether an installation has already been made; i.e., access is attempted to historical files which may already by resident in the computer of the apparent client to determine if an installation has already been successfully made. If so, the process flow is immediately transferred to the Client Transaction Initiation subprocess (FIG. 2, connector 300 to block 310) via connector A 30. While the Client Transaction Initiation subprocess will be described in detail below, it may be noted at this point that that subprocess will first scrutinize the claim that a legitimate installation has already been installed in the apparent client.

Assuming that the client is new and that the Client Account Initialization subprocess must be carried out, at step 50, an initial installation input form is displayed. At step 60, client specific information is entered. While the information requested on the installation input form may be whatever the management of the host system may select, for explanation of the invention, the following information is employed:

First Name—[FirstName]
Last Name—[LastName]
First and last name concatenated—[SignatureName]
Social Security Number—[SocialSecurityNumber]
Date of Birth—[DateOfBirth]

As will become more apparent below, this information is required to be entered into the host system to facilitate the initialization of a [ClientAccountNumber] and a [ClientUnlockCode]. The [ClientUnlockCode] is used to unlock or activate the client installation while the [ClientAccountNumber] is an integral component of each subsequent transaction with the given client. While it is considered outside the scope of the invention, it is strongly recommended that this input process be programmatically governed to insure the completeness of the information being provided. When the material has been entered to the satisfaction of the client, it is accepted by the installation software.

Next, at step 80, the installation time (to the millisecond) [InstallationTime] and date [InstallationDate] are acquired and stored.

At step 90, an elaborate procedure is used to generate [Register_1], [Register_2] and [Register_3] values. The following describes the content and methods used to generate the registers mentioned in this process.

[Register_1]: Contains the number of seconds passed between midnight and the stored [InstallationTime]. This value is determined to the millisecond and hashed producing a recommended minimum 128 bit value. The hashing algorithm used to produce this value preferably manipulates both alpha, or non numeric and numeric values. It should create a resulting alphanumeric string equal to or greater than the length of the originating value being hashed. The resulting value preferably contains both alphabetic and numeric values in order to extend the difficulty of unauthorized reproduction any derived value. The hashing algorithm should follow prescribed hashing standards publicly or privately available to the industry and is supplied at both the host and the client.

[Register_2]: Contains a randomly generated and hashed integral number preferably having a minimum length of 128 bits. The resulting value preferably contains both alphabetic and numeric values in order to extend the difficulty of unauthorized reproduction any derived value. The hashing algorithm should follow prescribed hashing standards publicly or privately available to the industry and is supplied at both the host and the client. Preferably, a different algorithm is used for developing each Register component.

[Register_3]: Contains a hashed representation of values gleaned from various hardware components of the machine that the client is being installed upon. Preferably, commonly available characteristics of a client computer, such as ROM ID, memory configuration and hard drive type and configuration information, should be used. The more system configuration information used provides for stronger hardware "finger printing". This "finger printing" approach is an important aspect of the unique authentication process implemented in the subject technology. Preferably, the resulting value should be no less than 128 bits in length. The resulting value preferably contains both alphabetic and numeric values in order to extend the difficulty of unauthorized reproduction any derived value. The hashing algorithm should follow prescribed hashing standards publicly or privately available to the industry and is supplied to both the host and the client.

As noted, all information acquired in this process can be developed utilized known industry standard theories, commercially available products and commonly known programming techniques. Preferably, the hashing routines used in this process should be of a standard no less than those prescribed in the National Institute of Standards and Technology's (NITS) "*Secure Hash Standards (SHS)*" FIPS PUB 180, May 11, 1993. These standard levels should be assumed throughout this specification.

At step 100, a second form is displayed at the client computer. This form includes display fields for programmatically generated information, and input fields for manually entered information. More particularly:

This second input form preferably includes fields for displaying and acquiring the following information which is either already existing, from previous programmatic generation, or requires manual input. Field content status is indicated next to the field name.

[InstallationTime]—Generated by acquiring the system time from the machine that the Client is being installed upon. This value is shared with the Host system as a required component in the Host's (see Host Client Account Initialization)generation of the [ClientAccountNumber].

[InstallationDate]—Generated by acquiring the system date from the machine that the Client is being installed upon. This value is shared with he Host system as a required component in the Host's (see Hos Client Account Initialization) generation of the[ClientAccountNumber].

[Register_1]—Specifics on the generation of this value have been given above. This information is used in the generation of the[ClientAccountNumber].

[Register_2]—Specifics on the generation of this value have been given above. This information is used in the generation of the [ClientAccountNumber] and [ClientUnlockCode].

[Register_3]—Specifics on the generation of this value have been given above. This information is used in the generation of the [ClientAccountNumber].

[ABANumber]—This information is manually entered by the installer of the client system as a required component of the host initialization process. This information is used in the generation of the [ClientAccountNumber].

[BankAccountNumber]—This information is manually entered by the installer of the client system as a required component of the host initialization process. This information is used in the generation of the [ClientAccountNumber].

[ClientAccountNumber]—This information is calculated by the host system through hashing the above values to produce a preferable minimum 128 bit value. The generated value is later verified by the client as a checking function to ensure synchronization between the client and host.

[ClientUnlockCode]—This information is calculated by the host system through hashing the [Register_2] value to produce a preferable minimum 128 bit value. The generated value is later verified by the client as a checking function to ensure synchronization between the client and host.

At step 110, the already acquired/calculated [InstallationTime], [InstallationDate], [Register_1], [Register_2], and [Register_3] are displayed, and, at step 120, [InstallationTime], [InstallationDate], [Register_1], [Register_2], and [Register_3] are communicated to the host by either a secure and automated electronic communication medium or manual communication medium in order that the host can independently generate the [ClientAccountNumber] and the [ClientUnlockCode] later in the process. Then, at step 130, the [ABANumber] and [BankAccountNumber] of the client banking account are entered manually at the client system. (This information is exemplary: it could be credit card, checking account, savings account information and the like. It is also possible to establish multiple accounts and multiple authorized signers to any given account.) It is necessary that this information be shared with the host system in the creation of trusted databases for account transaction processing. Thus, this information is sent to the host system by either a secure and automated electronic communication medium or manual communication medium.

The host system calculates the [ClientAccountNumber] and [ClientUnlockCode] and populates the second form at the client system with the result in step 140.

The following describes the content of the [ClientAccountNumber] and [ClientUnlockCode] generated by the host system.

[ClientAccountNumber]—Preferably no less than 128 bits in length, contains a hashed value sourced to the inclusion of following existing and generated values:

[Register_1]

[Register_2]

[Register_3]

[InstallationTime]

[InstallationDate]

[ABANumber]

[BankAccountNumber]

[ClientUnlockCode]—There is no particular preference as to the length of this value. It is generated as a verification device for account activation, and is provided by the host system resulting from its involvement in the installation process. The value contains a hashed manipulation of [Register_2] that must create a resulting string equal to or greater than the length of the originating value being hashed.

At step 150, the client is required to verify the [ClientAccountNumber] and [ClientUnlockCode]. Since the client and the host should have the same information and employ the same hashing algorithms, the client system should calculate the same [ClientAccountNumber] and [ClientUnlockCode]. This step serves the purpose of ensuring that the information has been entered correctly, considering the manual entry of some of the items. In the implementation of the invention, the client is given three opportunities to verify the [ClientAccountNumber] and [ClientUnlockCode]. It is recommended that a limited, three tries, loop back be provided as depicted at step 165. A three strike failure causes the installation to exit at step 160 to terminator 170. If there have been three failures to the verification, then the subprocess must be aborted or restarted from the beginning at step 10. This recommended feature is a safeguard against unauthorized implementation of account information to, for example, generate a bogus account. It helps to insure that the appropriate host organization is involved in the process.

At step 180, a third form (recommended to protect against unauthorized access to the client application) is displayed for entry of the user interface password [UIPassword], and, at step 190, the [UIPassword] is manually entered by the client. Typically, the client is given [UIPassword] length requirements. Thus, the client enters its own selected password which, preferably, consists of a combination of letters, numbers and symbols. At step 200, the client is asked to verify the [UIPassword] just entered as a safeguard against mistakes in entry. The client may be given, for example, three opportunities to successfully verify the [UIPassword] and, if unsuccessful, the subprocess is exited at step 210 through a loop at step 220. The loop at step 220 is preferably cancelable and the verification process set to be completed at the next entry to the application.

Assuming successful verification of the user interface password, the first [SignatureKey] is initialized at step 230. The following describes the content and process involved in generating the first [SignatureKey] which contains a hashed value sourced to the inclusion of the following generated and stored values.

[ClientAccountNumber]

[InstallationTime]

[InstallationDate]

[SignatureName]

[DateOfBirth]

[SocialSecurityNumber]

The [SignatureKey] is simultaneously generated on the host system and stored for ongoing [SignatureKey] generation. Each [SignatureKey] represents a digital signature of each and every transaction processed using the subject technology. Subsequent transaction specific keys generated are based in part on previous transaction information.

At this point, step 240, the client system prepares a comprehensive series of copy protection and control files for ongoing use of the client. The following describes a recommended implementation of a copy protection and control file management scheme:

[NcxMain_0]—This file contains the hard drive sector location of the control file [NetChex_A], a hashed value of the content and its last recorded size. This file is preferably configured to resist being copied, deleted, modified and is hidden.

[NcxMain_1]—This file contains the hard drive sector location of the control file [NetChex_B], a hashed value of the content and its last recorded size. This file is also configured to resist being copied, deleted or modified and is hidden.

[NcxMain_2]—This file contains the hard drive sector location of the control file [NetChex_C], a hashed value of the content and its last recorded size. This file is also configured to resist being copied, deleted or modified and is hidden.

[NcxMain_3]—This file contains the hard drive sector location of the control file [NetChex_D], a hashed value of the content and its last recorded size. This file is also configured to resist being copied, deleted or modified and is hidden.

[NetChex_A]—This file is used for copy protection and contains the current [UIPassword]. This file is also configured to resist being copied, deleted or modified and is hidden.

[NetChex B]—This file contains the encrypted values of [Register_1], [Register_2], [Register_3], [InstallationTime], [InstallationDate], [SocialSecurityNumber] and [DateOfBirth].

[NetChex_C]—This control file contains the encrypted values of [AuthorizationDate], [AuthorizationTime], [TransactionCounter] and [SignatureKey]. It is important to note that the [AuthorizationTime] and [AuthorizationDate] are initiated by assigning the values of [InstallationTime] and [InstallationDate] to the two values, respectively. Ongoing transactions will update these values based on transaction specific dates and times.

[NetChex_D]—This file contains the encrypted values of the immediately previous transaction's [YTDTransactionTotal], [LastTransactionDate], [LastTransactionTime], [PreviousTransactionAmount], [PreviousMerchant] and [PreviousTransactionNotes].

The encryption methods used to protect the information being stored in the various files should adhere to a minimum standard level as set forth in literature exampled by *"Contemporary Cryptology: The Science of Information Integrity"*, IEEE Press, New York, 1992.

At step 250, [MemberDatabase] and [TransactionHistory] files are created on the client while respective files on the host system are updated. The following describes the recommended base information contained in a typical [MemberDatabase]. The host system contains a mirrored version of the information held at the Client. The host also holds additional information inclusive of the information contained in the control files as previously described.

[ClientMemberDatabase]
[ABANumber]**
[BankAccountNumber]**
[ClientAccountNumber]**
[SignerNumber]**
[LastName]
[FirstName]
[SignatureName]
[AddressLine_1]
[AddressLine_2]
[City]
[State]
[ZipCode]

The fields indicating '**' are used to order the table itself. This key structure allows for multiple accounts and multiple signers per account.

When the Client Account Initialization subprocess successfully performs all these tasks, the installation has been completed satisfactorily and is valid leaving the client in an active state prepared to initiate transactions for authorization.

B) Client Transaction Initiation

The flowchart of FIG. 2 shows the subprocess that is followed when initiating and validating a transaction between the host and client over a public communications medium, such as the Internet, according to the invention. Successful completion of this process requires that the client and host systems have been properly setup and initialized prior to initiating a transaction. The host account information and client control and copy protection files cooperate interactively to safely complete the transaction.

A request to initiate a transaction enters at connector A 30 (see also FIG. 1), and, at step 310, the installation, already known to be present, is checked for validity. This evaluation process is directed to ascertaining whether or not the client has all of the files that it needs and that the client installation/client application has not been tampered with since its last use. The following is a description of the preferable minimum requirement to verify that the data required are available and intact.

File verification sequence:
1. Evaluate and determine that all required files are available.
   [ClientMemberDataBase]
   [NcxMain_0], [NcxMain_1], [NcxMain_2], [NcxMain_3],
   [NetChex_A], [NetChex_B], [NetChex_C], [NetChex_D]
2. Interrogate and verify that no control file has been moved by retrieving sector locations.
3. Interrogate and verify that no control file information has been tampered with by retrieving file size and has values.

All interrogation must pass accordingly to proceed. Any failure will result in the client application being disabled requiring reinstallation of the client system. Thus, if there is a failure, the subprocess exits at step 320 to connector 330 and aborts after generating appropriate alarms and saving any information which might be helpful in determining the source of the failure to pass this validation process.

If the client installation is validated, the subprocess continues from step 320 to step 430 in which a password input form is displayed for the client to make entries in. This requires the successful entry of the previously selected [UIPassword] at step 350 for local checking at step 360. If the entry is made incorrectly (e.g., as a result of a typographical error), step 370 sends the failure through connector 375 back to step 340 in order to provide a limited, e.g., three, number of retries before the subprocess is aborted at step 376.

Assuming that the [UIPassword] is entered correctly, a main application form is displayed to the client at step 380 such that the client can, for example, select the type of transaction to be handled at step 390. Accordingly, at step 400, a particularized transaction form is displayed for entry of information by the client at step 410.

The following exemplifies the preferable minimum information required to provide for a complete financial transaction. Additional information can and should be added at this point. The presentation made here is for examplary purposes only.

Transaction information manually acquired and stored.
[MerchantIndentification]
[TransactionAmount]
[ClientTransactionIdentification]
[ShipToInformation]

Generated and stored information (Acquired when the transaction is signed):
[TransactionDate]
[TransactionTime]

The action of "signing" the transaction is relevant to the assignment of responsibility as established by federal laws and regulations pertaining to electronic commerce and digital signatures.

To this point in the subprocess, all steps in the transaction initiation process have been performed locally on the client system.

When all the necessary information has been entered, it is acknowledged at step 420, and an attempt is made to access the host system at step 430. If the host system is not available at step 440, unlimited retry is available through loop connector 450. It is recommended that a "time-out" be established to offer the user a conditional exit from this loop. If the user chooses to exit the loop it is recommended that the client application return to step 400 through step 455. When the availability of the host system is confirmed, the local client system takes a series of steps in preparation for instituting the actual transaction.

At step 460, previous transaction information is retrieved, and these values are temporarily stored to facilitate the creation of a new transaction array [ValTranArray] at step 480. The following describes the minimum required information to proceed with the generation of a transaction as prescribed by this example. The information depicted below will be stored in the newly created ValTranArray for use in the generation of process specific key values.

[MemberDatabase]
[ClientAccountNumber]
[SignerNumber]
[SignatureName]
[NetChex_B]
[Register_1]
[Register_2]
[Register_3]
[InstallationTime]
[InstallationDate]
[SocialSecurityNumber]
[DateOfBirth]
[NetChex_C]
[AuthorizationDate]
[AuthorizationTime]
[TransactionCounter]
[SignatureKey]
[NetChex_D]
[YTDTransactionTotal]
[LastTransactionDate]
[LastTransactionTime]
[PreviousTransactionAmount]
[PreviousMerchant]
[PreviousTransactionNotes]

Next, at step 490, a new (SignatureKey) is generated by utilizing the following information.
[SignatureKey]
[SignatureKey] Stored (previously)
[LastTransactionDate]
[LastTransactionTime]
[PreviousTransactionAmount]
[PreviousMerchant]
[PreviousTransactionNotes]
[SocialSecurityNumber]
[DateOfBirth]
[SignatureName]

The returned hashed value will be used as the current transaction's [SignatureKey]. Preferably, a minimum of 128 bits should be used as a marker for the length of this value.

Then, at step 500, a new [EncryptionPassword] is generated utilizing the following information.
[EncryptionPassword]
[SignatureKey]
[PreviousAuthorizationTime]
[PreviousAuthorizationDate]
[Register_2]
[SocialSecurityNumber]
[DateOfBirth]

Preferably, a hashed value resulting in 128 bits in length should be generated in this step.

At step 510, the transaction information is encrypted. This step encrypts the base transaction information, utilizing the previously generated [EncryptionPassword], for transfer to the host system. The following information shows an example of the type of information that would typically be encrypted at this point in the process.
[MerchantIdentification]
[MerchantIdentification_CheckSum]
[TransactionAmount]
[TransactionAmount_CheckSum]
[ClientTransactionIdentification]
[ClientTransactionIdentification_CheckSum]
[ShipToInformation]
[ShipToInformation_CheckSum]
[TransactionDate]
[TransactionDate_CheckSum]
[TransactionTime]
[TransactionTime_CheckSum]

The encryption methods used to protect the information being stored in the various control files should adhere to a minimum standard level as set forth in literature exampled by "*Contemporary Cryptology: The Science of Information Integrity*", IEEE Press, New York, 1992.

The encrypted transaction information is stored locally at step 520.

At step 530, a message authentication code [MAC] is generated. The generation of this code is critical to the invention's ability to achieve irrefutable authentication. This code is generated utilizing the following components and hashing them to produce two equal length values parsed from a larger value.
[MAC] Message Authentication Code
[Register_1]

[Register_2]
[Register_3]
[SignatureKey]
[YTDTransactionTotal]
[LastTransactionDate]
[LastTransactionTime]
[PreviousTransationAmount]
[PreviousMerchant]
[PreviousTransactionNotes]

A preferable length for each part of the two part [MAC] should be no less than 1024 bits. In addition, the date and time that the [MAC] was generated is stored for further transaction code generation. These values will be transferred to the host system as [AuthorizationTime] and [AuthorizationDate] to be used in future transaction key generation similar to [TransactionDate] and [TransactionTime].

A Transaction Table is created at step 560. The Transaction Table is a file that contains the encrypted information. The following represents an example of the information that can be included in the Transaction Table. All information if acquired from [NewTranArray] and [ValTranArray].

Transaction Table
[ClientAccountNumber]**
[MerchantIdentification]
[MerchantId_CheckSum]
[TransactionAmount]
[TransactionAmount_CheckSum]
[ClientTransactionId]
[Client TransactionId_CheckSum]
[ShipToInformation]
[ShipToInformation_CheckSum]
[TransactionDate]
[TransactionDate_CheckSum]
[AuthorizationDate]
[AuthorizationDate_CheckSum]
[AuthorizationTime]
[AuthorizationTimeCheckSum]
[MAC]
[MAC_CheckSum]

All values are assumed to be encrypted using the transaction specific [EncryptionPassword] unless otherwise indicated.

**This version of the [ClientAccountNumber] is not encrypted. This is required to provide the host system with the ability to find the required information to decrypt the transaction information.

Additional information can be included as either encrypted data or not depending upon the purpose of the information. All CheckSum values are recommended to be a minimum of 80 bits in length, but are recommended to vary in length by individual value being held. This is recommended to further protect the information being represented. These CheckSum's are recommended as a device to further insure the integrity of the information being sent.

At step 570, the availability of the already acquired host system to receive the transaction transmission is checked; if it has become unavailable to receive the transaction, retries are carried out through loop connector 590 via step 580. It is recommended that a "time-out" be established to offer the user a conditional exit from this loop. If the user chooses to exit the loop it is recommended that the client application return to step 400 through step 595. When the host system is ready to receive the transaction transmission, the Transaction Table is sent via the open communications channel, and successful transmission is checked at step 610 by conventional handshaking expedients. If the transmission was unsuccessful, retries are undertaken through loop connector 630 from step 620. It is recommended that the option be established to offer the user a conditional exit from this loop. If the user chooses to exit the loop it is recommended that the client application return to step 400 through step 635. When the transmission is successful, control file housekeeping is carried out at step 640. For example, [NetChex_C] and [NetChex_D] are updated at the host with the latest transaction information.

At this point, communication has been established between the client and host, and the client is known by the host to irrefutably be legitimate and the specific client claimed.

C) Host Transaction Server

For completeness, the following description of the host includes certain preliminary steps that are not repeated for each transaction. Specifically, recommended preparation to start the host monitoring process.

Figure 3A:
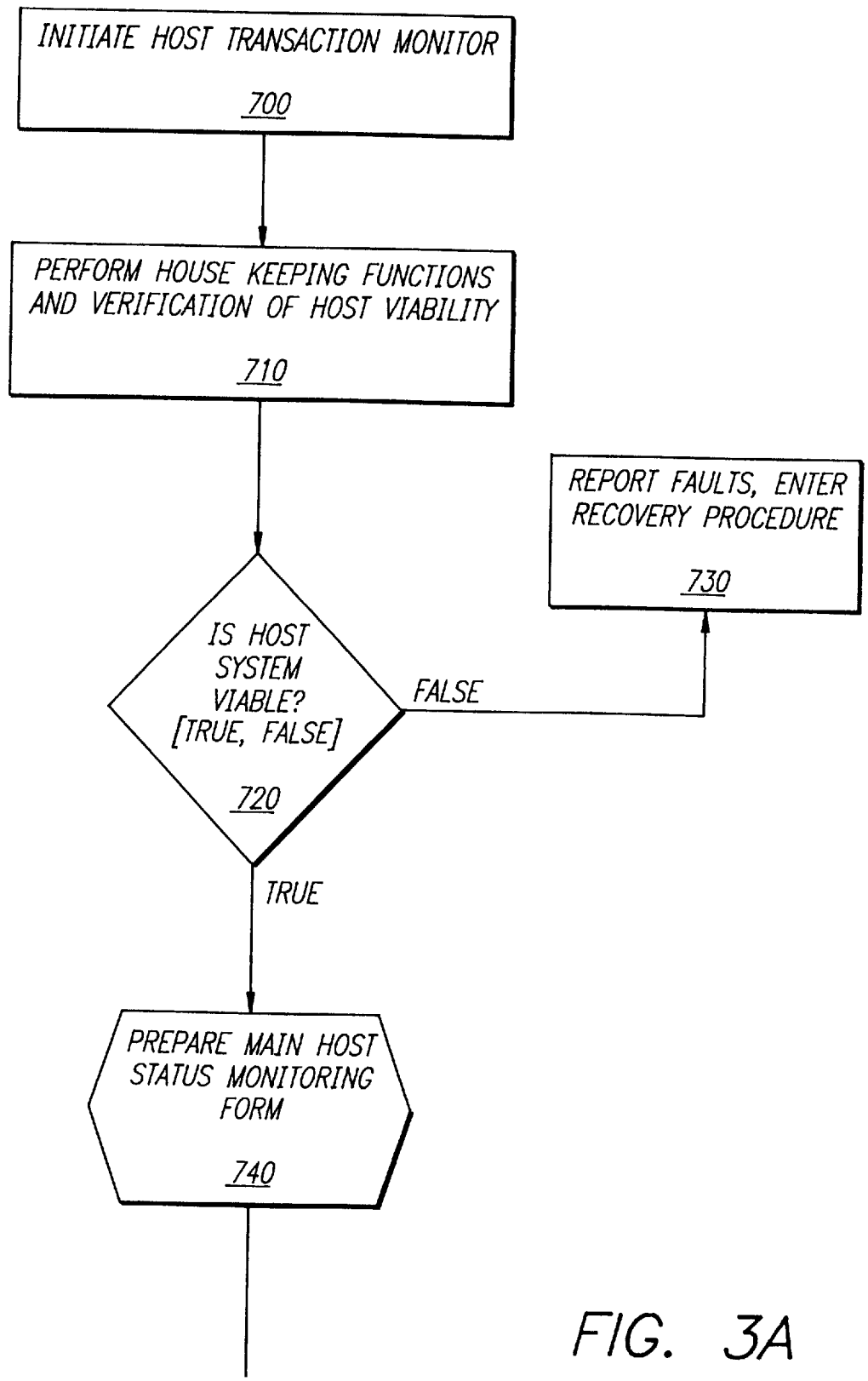
FIG. 3 constituting FIGS. 3A through 3I, inclusive, is a flow chart illustrating a Host Transaction Server subprocess of the invention.
Figure 3B:
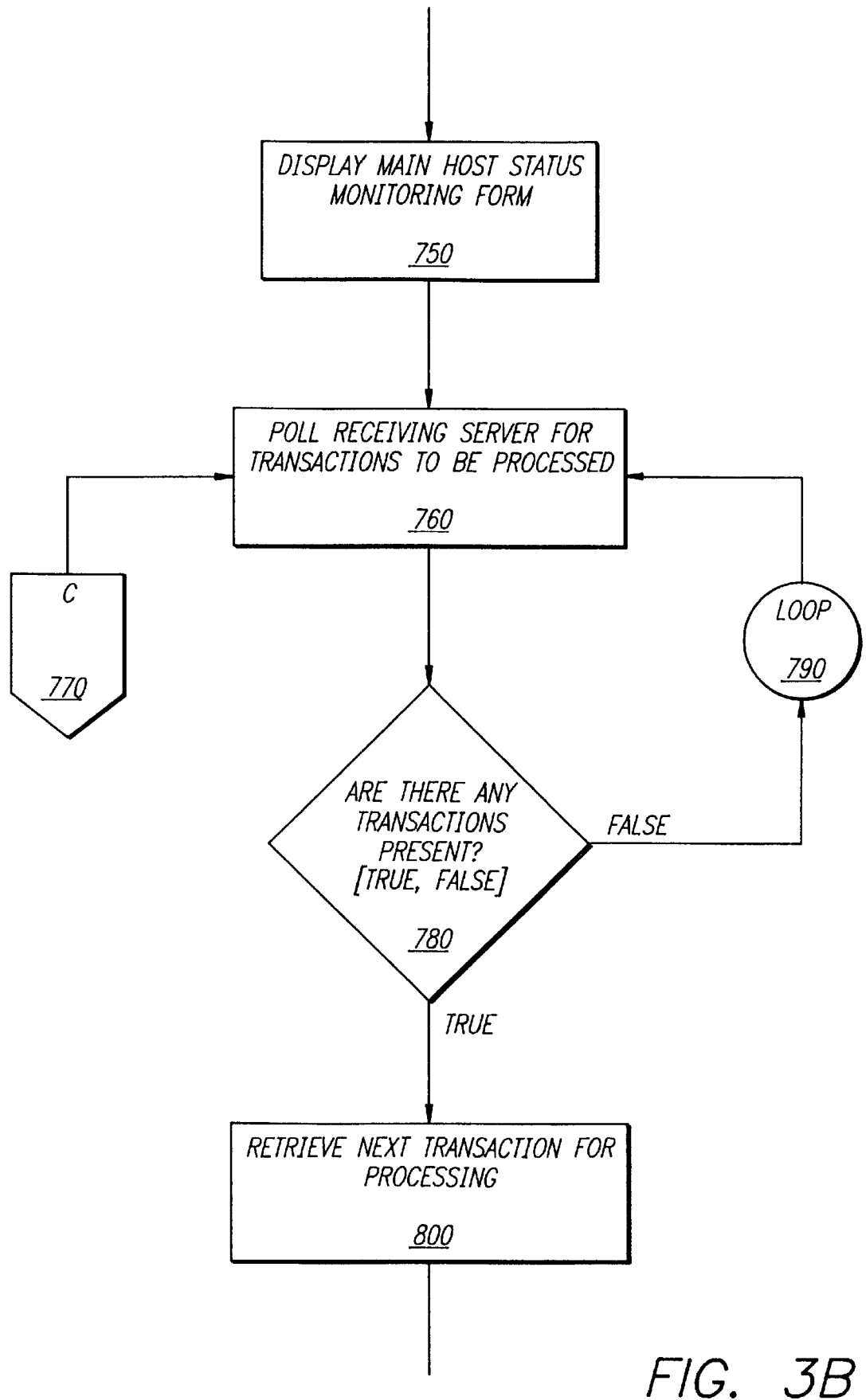
Figure 3C:
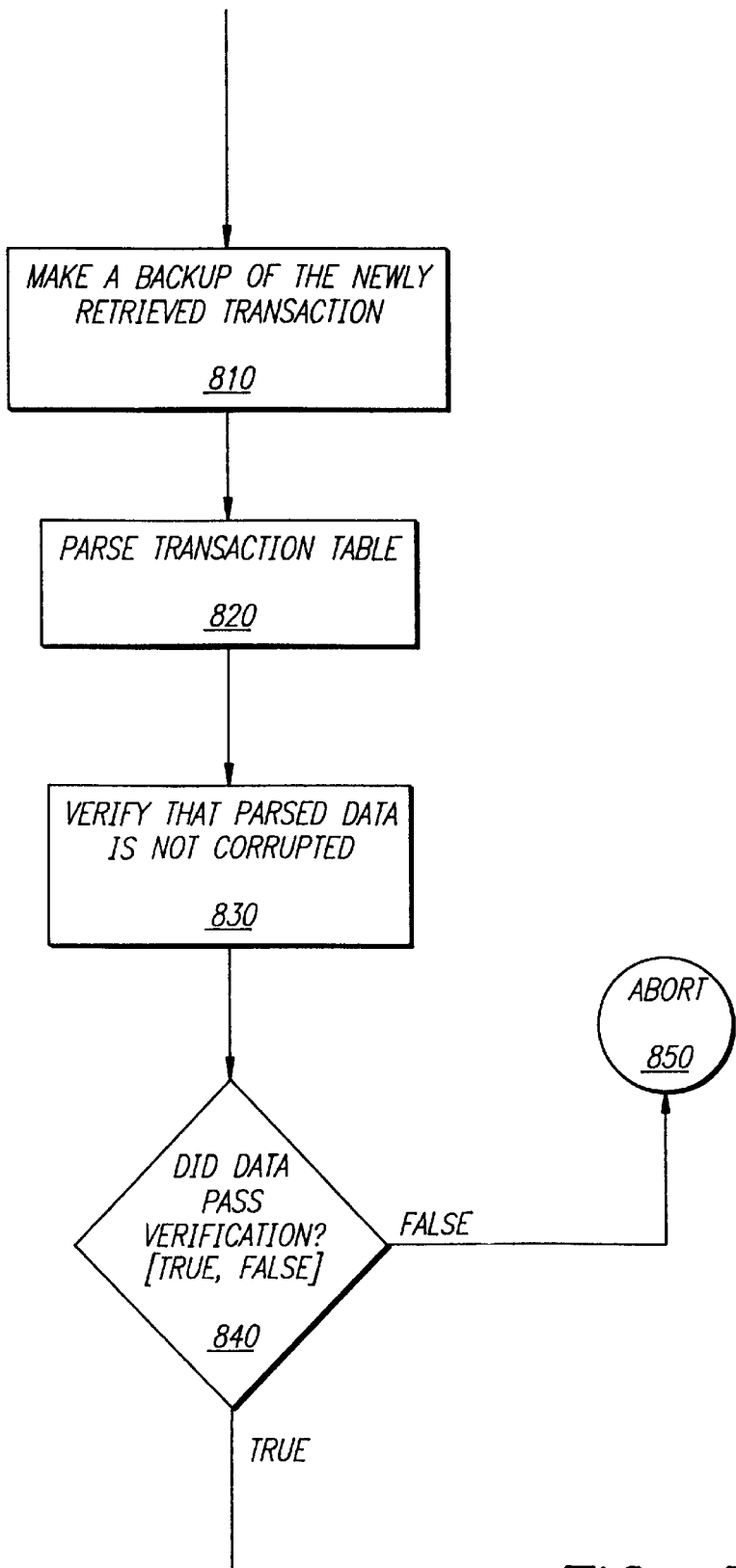
Figure 3D:
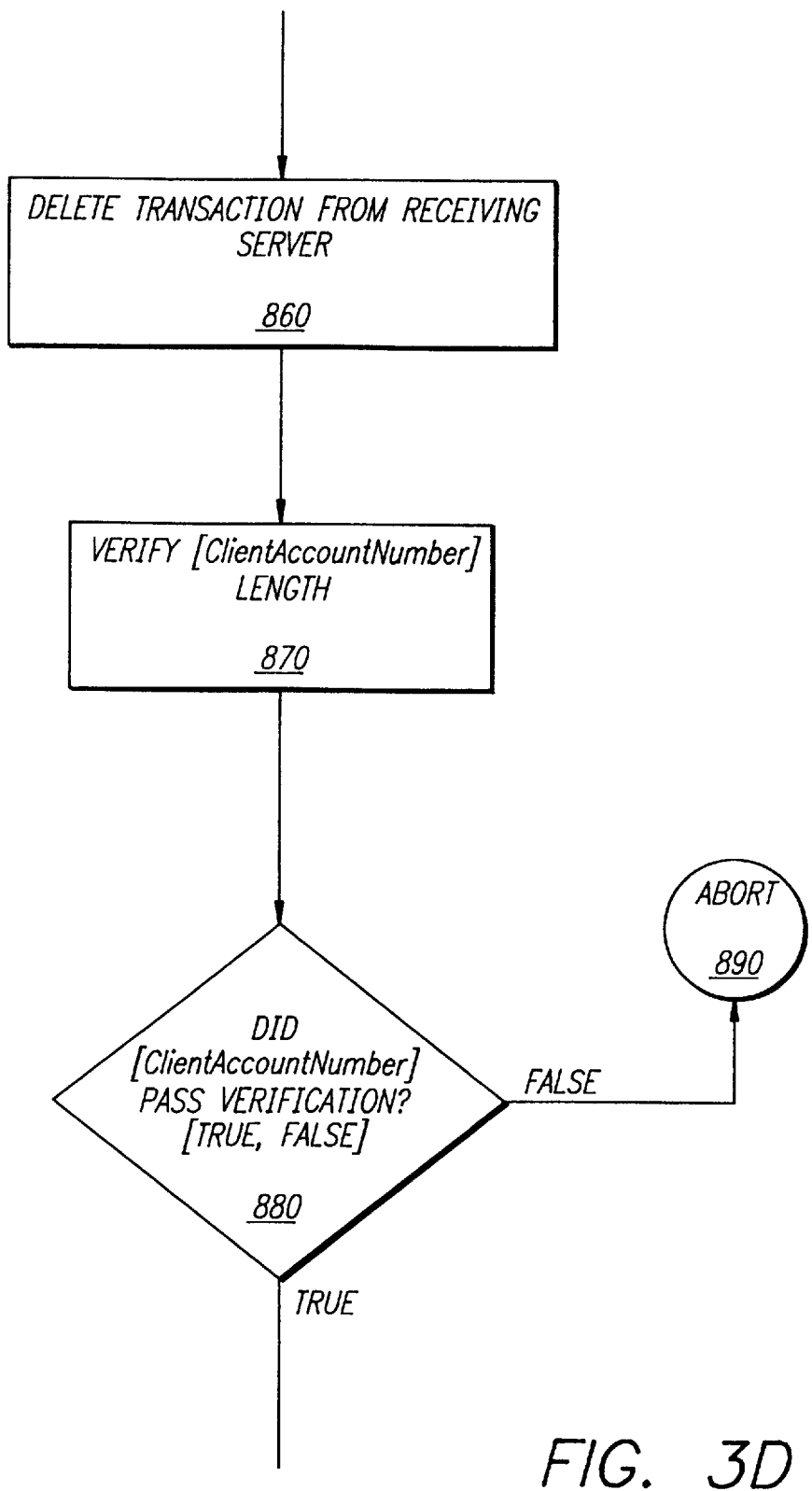
Figure 3E:
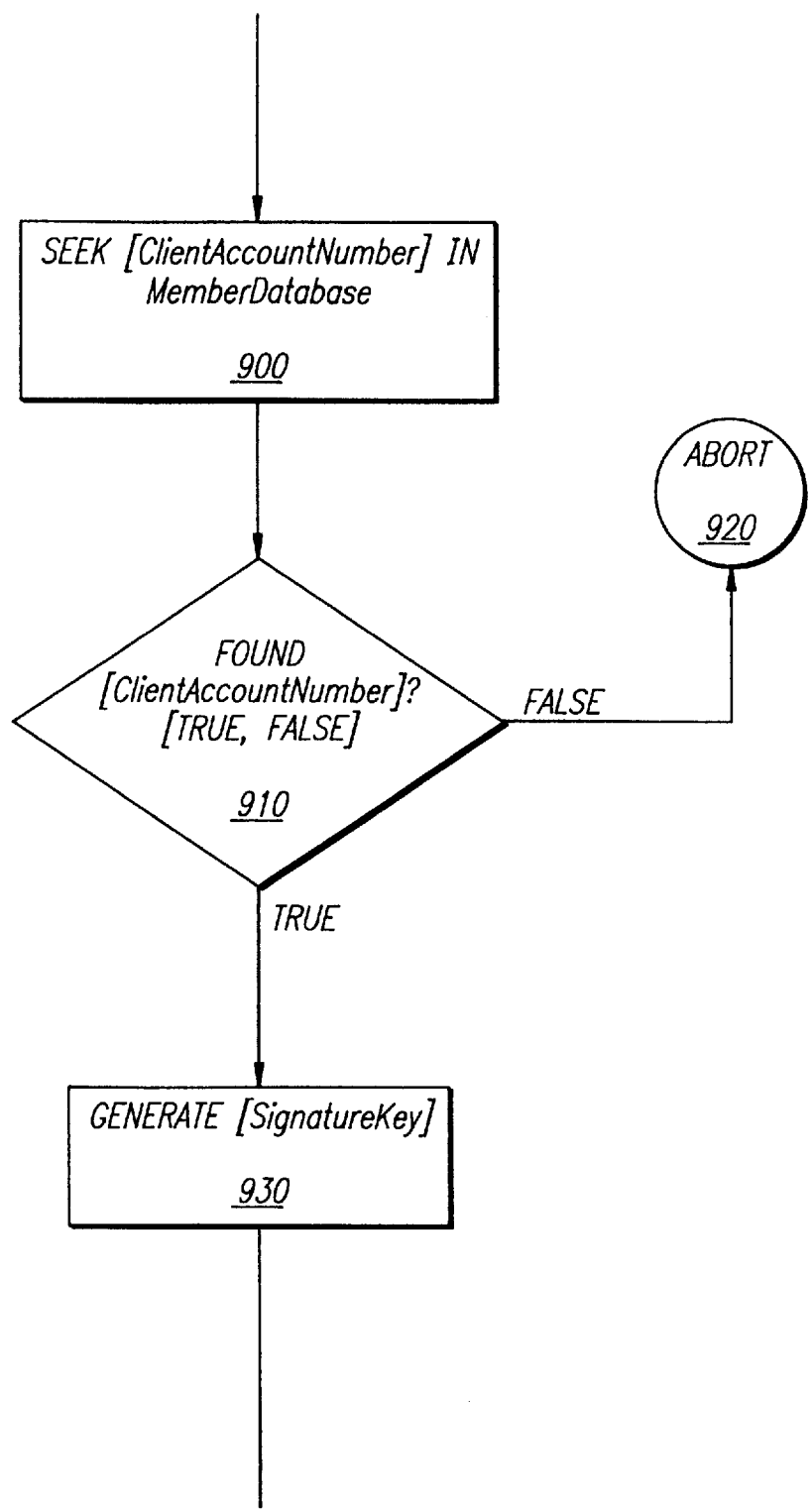
Figure 3F:
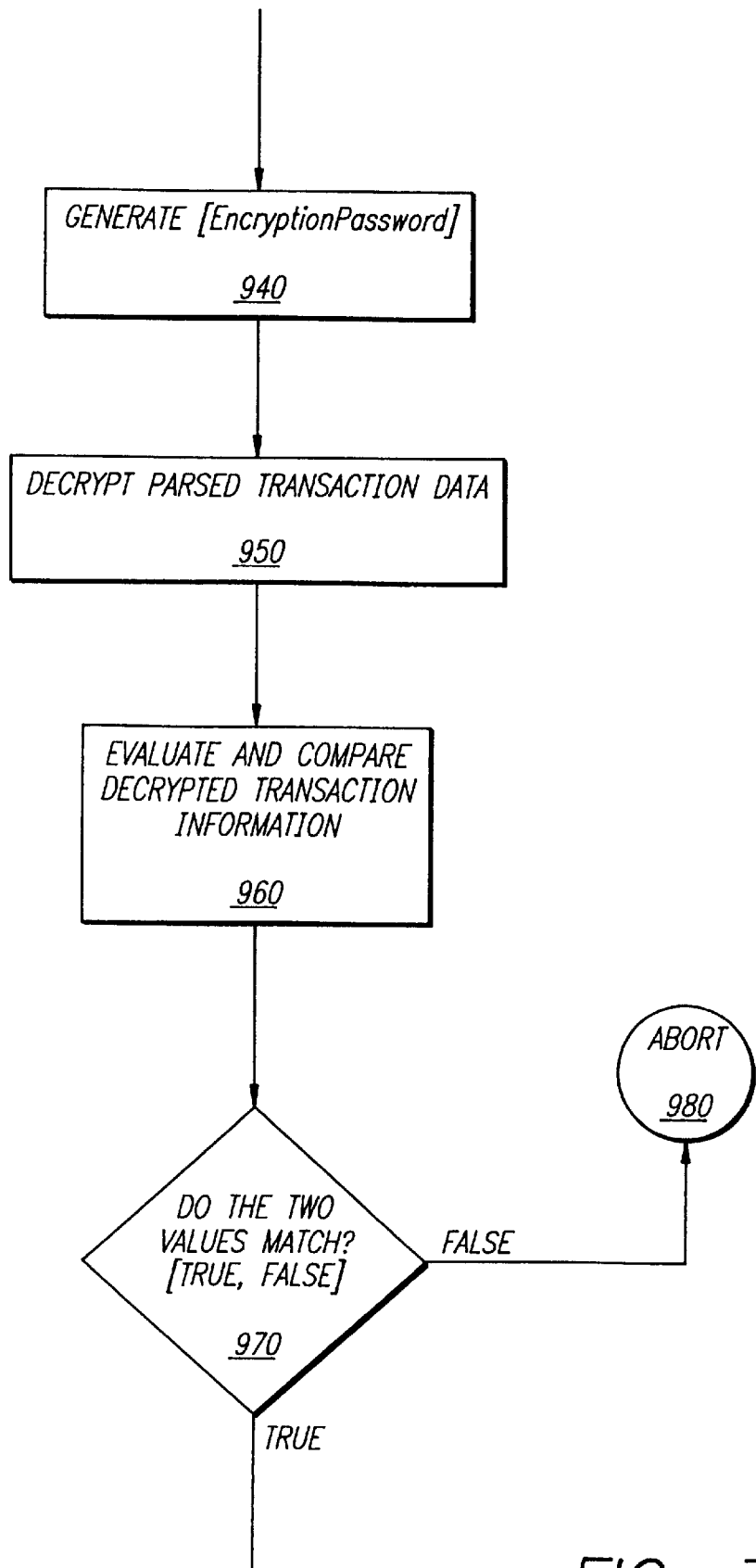
Figure 3G:
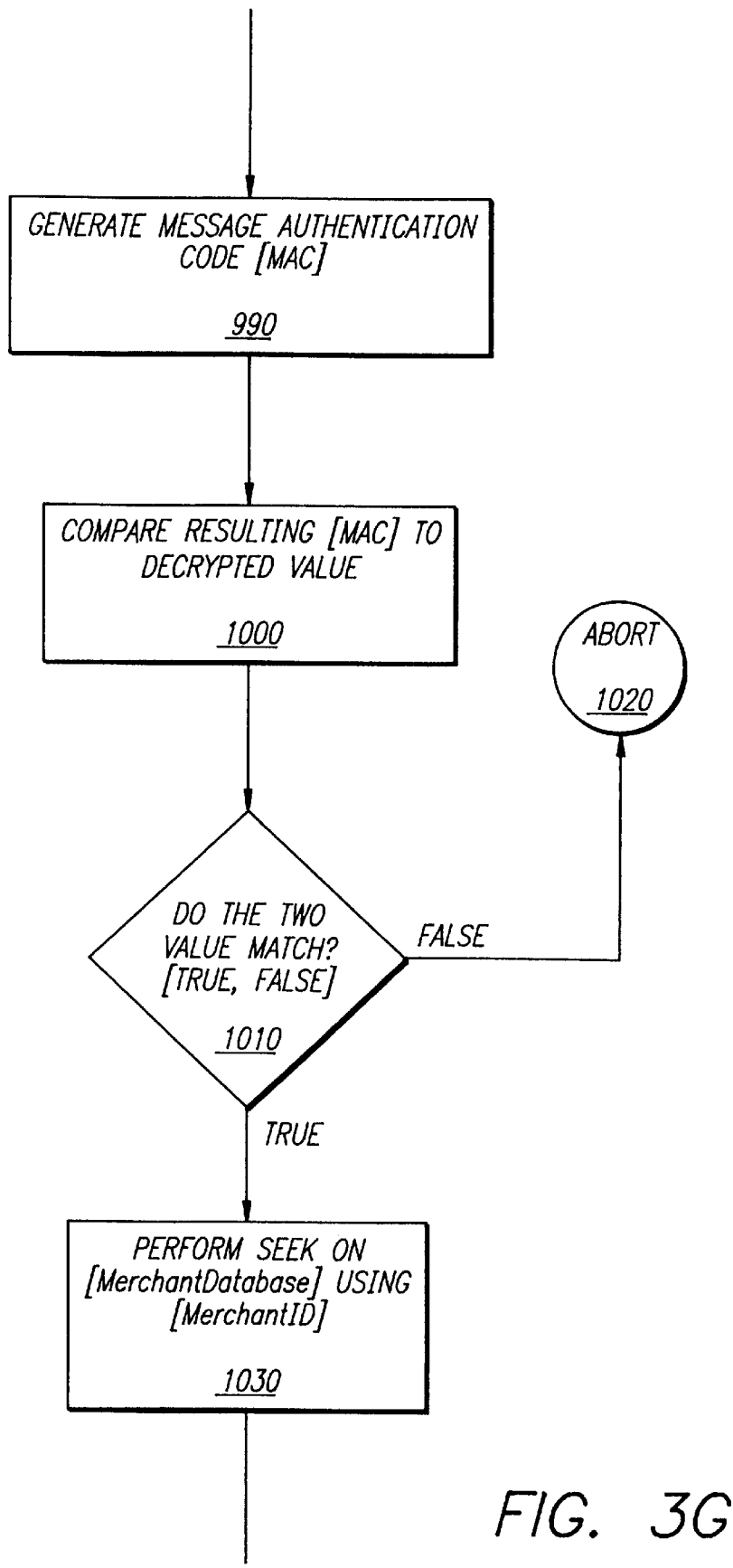
Figure 3H:
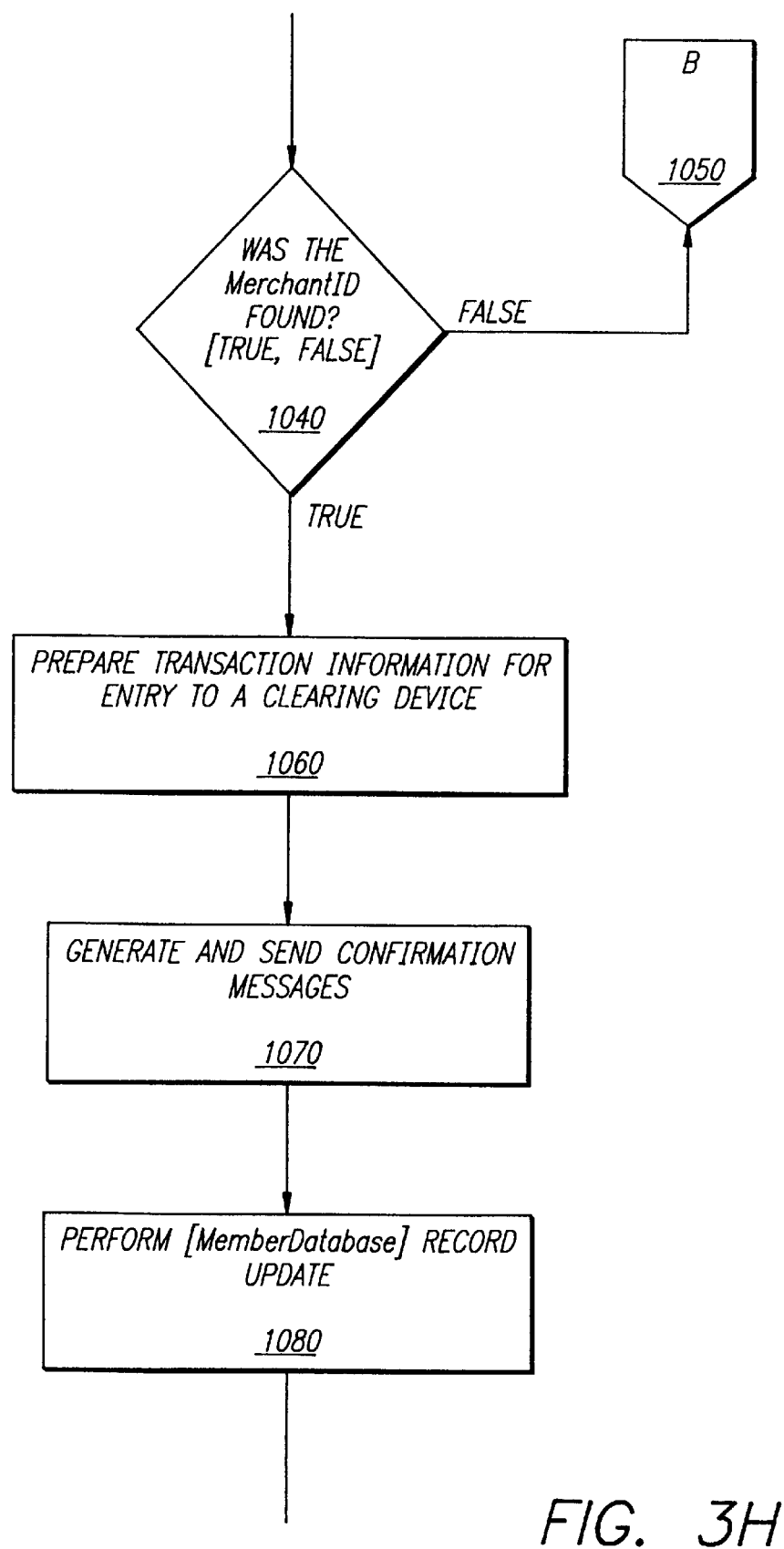
Figure 31:
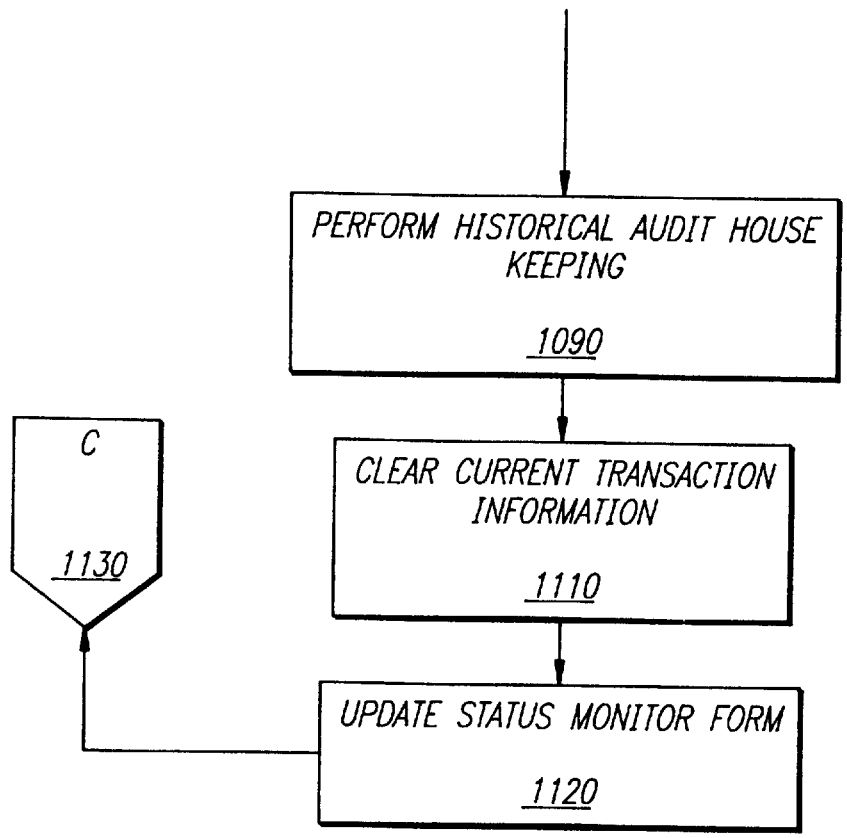

FIG. 3 shows the host subprocess followed in receiving and processing a transaction request received from a client system. It is important to note that this process is dependent upon initial setup parameters received from and synchronized with the client installation. As transactions are processed, both the client and host systems maintain a level of synchronization required to perform specific functions, encryption/decryption and authentication to name an example, and general processing of transaction information.

It will be understood that each (Abort) point results in administrative notification and storage of transaction status and reason for aborting the transaction processing function. This is critical in aiding in the establishment of fraud deterrence and system integrity. However, details about the extent of reporting and action taken as a result of an aborted process is outside the scope of this specification and should be considered as merely ancillary to the subject technology. It is only notable that the subject technology provides the ability to take action as prescribed by the implementing entity of the technology.

Thus, referring to FIG. 3, the host first undertakes an assessment of its own viability at steps 700 and 710. This specific procedure constitutes good programming practice in the context of the subject technology to ensure that the required resources are available for the host application to perform it designated tasks. For the purposes of this example, the following are among the types of information that might be verified to be in existence and complete.

Housekeeping functions:
  Communications testing
  Access the ReceivingServer
  Access the TrustedDataServer
Data and processing file testing
  ReceivingServer transaction table integrity test
  TrustedData table integrity test
  Interim table test
System integrity testing
  Verify that security devices are functioning
  Verify that system redundancy measures are performing correctly If an internal problem is identified, the process flow is diverted at step 720 to step 730. The diagnostic and recovery procedures are not a part of this invention and are not considered further herein.

After normal verification, a status monitoring task is initiated at step 740 and displayed at step 750. Monitoring status is intended to provide information relating to transaction based statistics. The specifics of the information represented on this form fall outside the scope of the subject technology and are assumed ancillary. Nevertheless, it is recommended that the information represented in this form be considered an important component of an over-all system consideration.

At step 760, the [ReceivingServer](s) is (are) polled to determine if there are any active requests for client transactions to be processed. This function is specific to the repetitive inquiry performed of the [ReceivingServer] to determine if there are transactions to be processed. Typically, transactions received are managed on a first in first out (FIFO) basis, and a table is used to manage the multiple transactions being accommodated. This table would be maintained by ancillary conventional processes outside the scope of the subject technology.

If there are no active, unserviced requests, the subprocess loops through feedback connector 790 from decision step 780. However, if there is a transaction request present, it is retrieved at step 800, and the processing begins by making a backup copy of the transaction at step 810. Then, the received Transaction Table is parsed at step 820.

This process manages the parsing function of the transaction information received. All information is received as a single string of information without delimiting characters. The following describes the base information required to be parsed in the exemplary system.

Transaction Table
[ClientAccountNumber]**
[MerchantIdentification]
[MerchantIdentification_CheckSum]
[TransactionAmount]
[TransactionAmount_CheckSum]
[ClientTransactionId]
[ClientTransactionId_CheckSum]
[ShipToInformation]
[ShipToInformation_CheckSum]
[TransactionDate]
[TransactionDate_CheckSum]
[AuthorizationDate]
[AuthorizationDate_CheckSum]
[AuthorizationTime]
[AuthorizationTime_CheckSum]
[ClientAccountNumber]
[ClientAccountNumber_CheckSum]
[MAC]
[MAC_CheckSum]

The '**' indicated [ClientAccountNumber] is not encrypted to provide access to the [MemberAccountDataBase] information required to decrypt and authenticate the transaction. All subsequent fields are encrypted and must be decrypted prior to being used for evaluation or processing functions.

At step 830, the parsed data is checked to ensure that the record is complete and has not been corrupted during the transfer process. If the data is found to have been corrupted during transmission, the process is aborted at step 850 from decision step 840.

Assuming that the data has not been corrupted, the transaction is deleted from the [ReceivingServer] [ReceivedTransactionTable], and an elaborate procedure of sequentially more difficult steps for ascertaining the irrefutable validity of the transmission is commenced at step 870 by verifying the [ClientAccountNumber] length just received against the assumed length of the value. If verification fails, the subprocess is aborted at step 890 from decision step 880.

Assuming that the length of the [ClientAccountNumber] is correct, the [ClientAccountNumber] itself is checked for inclusion in the [MemberDatabase] at step 900. If the [ClientAccountNumber] is not found in the [MemberDatabase], the subprocess is aborted at step 920 from decision step 910.

Assuming that the [ClientAccountNumber] is present in the [MemberDatabase], a new [SignatureKey] is generated at step 930. This function is dependent upon information acquired from the [MemberDatabase]. This information is kept in sequence with the Client Control Files to facilitate independent key value generation at both the client and host sites. The following describes the information required to generate the transaction specific [SignatureKey].

SignatureKey
[SignatureKey] Stored (previously)
[LastTransactionDate]
[LastTransactionTime]
[PreviousTransactionAmount]
[PreviousMerchant]
[Previous TransactionNotes]
[SocialSecurityNumber]
[DateOfBirth]
[SignatureName]

The returned hashed value will be used as the host's version of the current transaction's [SignatureKey].

At step 940, an [EncryptionPassword] is generated. This function is dependent upon information acquired from the [MemberDatabase]. This information is kept in sequence with the Client control files to facilitate independent key value generation at both the Client and Host sites. The following describes the information required to generate the transaction specific [EncryptionPassword]:

[Encryption Password]
[SignatureKey]
[PreviousAuthorizationTime]
[PreviousAuthorizationDate]
[Register_2]
[SocialSecurityNumber]
[DateOfBirth]

Then, the parsed transaction data is decrypted at step 950. This function is dependent upon information acquired from the [MemberDatabase]. This information is kept in sequence with the Client Control Files to facilitate independent key value generation at both the client and host sites.

Utilizing the transaction [EncryptionPassword], the parsed transaction information is decrypted to create a "readable" transaction. This information is evaluated at step 960. The primary purpose is to verify integrity of the decrypted data. The first step followed is to compare the [UnEncrypted_ClientAccountNumber] against the de-crypted [Encrypted_ClientAccountNumber]. If these values don't match, then the verification fails indicating that the transaction has somehow been tampered with.

This process also includes the comparison of the decrypted encrypted information against the included encrypted CheckSum values calculated at the time that the transaction file was generated. If any of the decrypted fields do not match the correspondingly expected CheckSum(s), the verification also fails indicating that the transaction has somehow been tampered with. If the values do not match, the subprocess is aborted at step 980 from decision step 970.

At step 990, a message authentication code [MAC] is calculated. This code is generated based on stored information in the host system's [MemberDatabase]. This information is also kept in sequence with the Client Control Files to facilitate independent key value generation at both the client and host sites. The following demonstrates the values involved in generating the transaction specific [MAC]. As with the corresponding step at the client system, this code is generated utilizing the following components and hashing them to produce two equal length values parsed from a larger value.

[MAC] Message Authentication Code
[Register_1]
[Register_2]
[Register_3]
[SignatureKey]
[YTDTransactionTotal]
[LastTransactionDate]
[LastTransactionTime]
[PreviousTransactionAmount]
[PreviousMerchant]
[PreviousTransactionNotes]

At step 1000, the resulting value is compared to the decrypted [MAC] received from the client.

The generated [MAC] must match the [MAC] received in the transaction. This step is critical in providing message authentication service for the subject technology. Failure results in a termination of the process indicating that the transaction has somehow been tampered with. Thus, if the two values do not match, the subprocess is aborted at step 1020 from decision step 1010.

Assuming that the [MAC]s match, a search is made in the [MerchantDatabase] using the received [MerchantID]. The pertinence of merchant information is specific to the generation of a complete transaction. Without merchant account information, the transaction is incomplete. It is necessary that the merchant bank account information be stored at the host site to obtain fully automated transaction processing. If the merchant account information is not presently in the [MerchantDatabase], a manual process van be initiated to acquire the information necessary to set up a new merchant account and complete the process. While this will cause a delay, no matter how short, the requirement will diminish over time. This issue is considered ancillary to the subject technology and outside the scope of this specification. If the [MerchantID] is not matched in the [MerchantDatabase], the subprocess if diverted to connector B 1050 for manual attention or abort. Specific action to be taken is considered outside the scope of this technology and subsequently ancillary.

Assuming that the [MerchantID] is present in the [MerchantDatabase], the transaction information is prepared at step 1060 for entry to a clearing device and sent along with a confirmation message, step 1070. This procedure is required to provide the information needed to produce a complete transaction for submittance to any transaction clearance organization, such as the Federal Reserve's Automated Clearing House (ACH) network or a credit card processor. The specifics of this format fall outside the scope of the subject technology and can be easily addressed by various standards in existence today.

The [MemberDatabase] record must now be updated at step 1080. This process includes the posting of various statistical and administrative information which are not directly relevant to the subject technology. However, the information to be updated that is specific to the scope of this specification is as follows. This step is critical in the interest of keeping both the client and host systems in synch with respect to manipulating values in the generation of key field values.

Host [MemberDatabase] key field updates:
[SignatureKey]
[YTDTransactionTotal]
[LastTransactionDate]
[LastTransactionTime]
[PreviousTransactionAmount]
[PreviousMerchant]
[PreviousTransactionNotes] Informational suggestion
Complete [MemberDatabase] table structure requirements and recommendations:
[ClientAccountNumber]**
[ABANumber]**
[BankAccountNumber]**
[SignerNumber]**
[LastName]
[FirstName]
[SignatureName] Concatenated [FirstName] [LastName]
[AddressLine_1]
[AddressLine_2]
[City]
[State]
[ZipCode]
[SocialSecurityNumber]
[DateOfBirth]
[SignatureKey]
[YTDTransactionTotal]
[LastTransactionDate]
[LastTransactionTime]
[PreviousTransactionAmount]
[PreviousMerchant]
[PreviousTransactionNotes]
[Register_1]
[Register_2]
[Register_3]
[InstallationTime]
[InstallationDate]
[AuthorizationDate]
[AuthorizationTime]

The '**' indicated fields are used to order the table.

It is important to note that additional electronic data interchange (EDI) requirements may necessitate additional tables and information to be stored at the host site. For the purposes of this specification, it is assumed that these requirements fall outside the scope of the subject technology.

The, at step 1090, routine historical audit housekeeping tasks are performed. While this step is not an integral part of the subject technology, it is included as an example of what is typically required as a reporting function of any host site providing transaction processing services.

To conclude the transaction at the host, the current transaction information is cleared at step 1110, the status monitor information is updated at step 1120, and flow passes to connector C 1130 which transfers the subprocess back to step 760 at which the server(s) can again be polled to determine if another client transaction request is waiting to be processed.

Referring now to FIG. 4, there is shown a typical environment in which the invention finds use. A client system 1200 is originally set up as described in the section above entitled Client Account Initialization, for example, over a secure telecommunication system, represented by telephone lines 1210 and telephone 1220, which is connected to system 1200. (As is well known in the art, the telephone connection is typically made directly to a modem integral with the system 1200. Also, as previously mentioned, there are alternative approaches to the communication aspects of the Client Account Initialization process such as the exchange of floppy disks.)

The host system 1230 includes customer service module 1240, open network (e.g. Internet) server 1320 transaction, server module 1250 and database server module 1260. Isolating the individual server components (1320, 1250, 1260) of host system 1230, permits optimal security of the individual tasks entailed in a complete transaction. For example, if desired, respective conventional security software/hardware "firewalls" 1270 may be provided between open network 1300 and open network server 1320; open network server 1320 and translation server 1250; and server 1250 and database server 1260. Thus, unencrypted confidential data is not exposed behind fewer than two firewalls. It will be seen that the Client Account Initialization process involves communication between the client system 1200 and the host customer service module 1240. When a given client account has been established with confidence as described above, the client account and merchant information is stored in database server module 1260 for use in carrying out transactions involving member clients and merchants.

Actual transactions can now be carried out securely over even notoriously insecure public transmission media, such as the Internet 1300, as described above in the sections entitled Client Transaction Initiation and Host Transaction Server. During a given client transaction, client account information is retrieved from the database server module 1260, across a security software/hardware "firewall" 1270, and is modified as described above for use in carrying out subsequent transactions. The current transaction is concluded by communication between the database server module 1260 and the bank/credit card/etc. infrastructure, using their required encryption, over a secure, closed communications medium 1310.

While the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A procedure for communicating sensitive information securely over an insecure medium from a first computer system to a second computer system to carry out transactions therebetween, the procedure comprising:

A) developing an account initialization data set at the first computer system, the account initialization data set including a plurality of fields, at least a first one of which fields includes information which is unique to the hardware comprising the first computer system;

B) duplicating the account initialization data set on the second computer system through a secure medium;

C) independently developing and storing at each of the first and second computer systems, from information included in the account initialization data set, using functionally identical algorithms, an initial client control file data set including a plurality of control fields, at least one of which control fields includes data developed from information which is unique to the hardware comprising the first computer system;

D) subsequently, communicating over an insecure communications medium an initial validation string generated from a plurality of client control file data set fields stored in the first computer system, at least one of which control file data set fields includes data developed from information which is unique to the hardware comprising the first computer system, and at least one additional field containing transaction specific information from the first computer system to the second computer system during initiation of a first transaction;

E) checking, at the second computer system, that the information in the initial validation string received from the first computer system is identical to a counterpart initial validation string generated from a plurality of client control file data set fields stored in the second computer system, at least one of which control file data set fields includes data developed from information which is unique to the hardware comprising the first computer system;

F) if the initial validation string received from the first computer system is found during step E) to be identical to the initial validation string generated at the second computer system, carrying out the transaction and going to step H);

G) if the initial validation string received from the first computer system is found during step E) to be different from the initial validation string generated at the second computer system, aborting the transaction;

H) developing and storing, at the first computer system, an updated client control file data set which is modified from the previous client control file data set, according to a predetermined modification procedure, based on new information which is specific to the transaction just carried out;

I) developing and storing, at the second computer system, an updated client control file data set which is modified from the previous client control file data set, according to the same predetermined modification procedure employed in step H), based on new information which is specific to the transaction just carried out such that the new client control files stored, respectively, in each of the first and second computer systems are identical;

J) subsequently, communicating over an insecure communications medium an updated validation string generated from a plurality of client control file data set fields stored in the first computer system, at least one of which control file data set fields includes data developed from information which is unique to the hardware comprising the first computer system, and at least one additional field containing transaction specific information from the first computer system to the second computer system during initiation of a transaction;

K) checking, at the second computer system, that the information in the updated validation string received from the first computer system is identical to a counterpart updated validation string generated from a plurality of client control file data set fields stored in the second computer system, at least one of which control file data set fields includes data developed from information which is unique to the hardware comprising the first computer system;

L) if the updated validation string received from the first computer system is found during step K) to be identical to the updated validation string generated at the second computer system, carrying out the transaction and going to step J); and M) if the updated validation string received from the first computer system is found during step K) to be different from the updated validation string generated at the second computer system, aborting the transaction.

2. The procedure of claim 1 in which at least one field in the initial and updated validation strings is hashed in the first computer system before transmission to the second computer system.

3. The procedure of claim 2 in which at least one of the fields in the initial and updated control files is encrypted to a depth which does not exceed that permitted by the relevant government authority.

4. The procedure of claim 1 in which at least a second field in the initial client control file data set contains user specific information.

5. The procedure of claim 4 in which at least one field in the initial and updated validation strings is hashed in the first computer system before transmission to the second computer system.

6. The procedure of claim 5 in which at least one of the fields in the initial and updated control files is encrypted to a depth which does not exceed that permitted by the relevant government authority.

7. The procedure of claim 4 in which at least one field in the initial client control file data set includes user social security number specific information.

8. The procedure of claim 7 in which at least one field in the initial and updated validation strings is hashed in the first computer system before transmission to the second computer system.

9. The procedure of claim 8 in which at least one of the fields in the initial and updated control files is encrypted to a depth which does not exceed that permitted by the relevant government authority.

10. The procedure of claim 7 in which at least one of the fields in the initial and updated control files is encrypted to a depth which does not exceed that permitted by the relevant government authority.

11. The procedure of claim 4 in which special purpose software for installing routines necessary to carry out the procedure at the first computer system are supplied to a user through a secure medium and in which a fourth field in the initial control file data set contains a representation of the installation time of the special purpose software.

12. The procedure of claim 11 in which at least one of the fields in the initial and updated control files is encrypted to a depth which does not exceed that permitted by the relevant government authority.

13. The procedure of claim 4 in which at least one of the fields in the initial and updated control files is encrypted to a depth which does not exceed that permitted by the relevant government authority.

14. The procedure of claim 1 in which at least a third field in the initial client control file data set contains information developed from a randomly generated and hashed integral number.

15. The procedure of claim 14 in which at least one of the fields in the initial and updated control files is encrypted to a depth which does not exceed that permitted by the relevant government authority.

16. The procedure of claim 1 in which special purpose software for installing the routines necessary to carry out the procedure at the first computer system are supplied to a user through a secure medium and in which a fourth field in the initial control file data set contains a representation of the installation time of the special purpose software.

17. The procedure of claim 16 in which at least one of the fields in the initial and updated control files is encrypted to a depth which does not exceed that permitted by the relevant government authority.

18. The procedure of claim 1 in which the field which includes information which is unique to the hardware is hashed.

19. The procedure of claim 18 in which at least one of the fields in the initial and updated control files is encrypted to a depth which does not exceed that permitted by the relevant government authority.

20. The procedure of claim 1 in which at least one of the fields in the initial and updated control files is encrypted to a depth which does not exceed that permitted by the relevant government authority.

21. The procedure of claim 20 in which an encryption password is developed in the first computer system from a plurality of stored control fields in conjunction with the initiation of each transaction, which encryption password is employed to encrypt at least one field including information pertaining to such transaction, such encrypted field being included in a validation string sent to the second computer, and in which, at the second computer system, a counterpart encryption password is developed from a plurality of stored control fields and used to decrypt the encrypted field.

22. The procedure of claim 21 in which a signature key is developed and stored in each of the first computer and second computer systems from a plurality of fields included in the account initialization data set and an assigned client account number.

23. The procedure of claim 20 in which a signature key is developed and stored in each of the first computer and second computer systems from a plurality of fields included in the account initialization data set and an assigned client account number.

24. The procedure of claim 1 in which a signature key is developed and stored in each of the first computer and second computer systems from a plurality of fields included in the account initialization data set and an assigned client account number.

* * * * *